April 3, 1962     B. DUNHAM     3,028,088
MULTIPURPOSE LOGICAL OPERATIONS
Filed Sept. 25, 1956     23 Sheets-Sheet 1

INVENTOR
BRADFORD DUNHAM
BY Alvin J. Riddles
AGENT

April 3, 1962  B. DUNHAM  3,028,088
MULTIPURPOSE LOGICAL OPERATIONS
Filed Sept. 25, 1956
23 Sheets-Sheet 2

| | p q r | | | | | |
|---|---|---|---|---|---|---|
| A | 1 1 1 | 1 1 1 1 | 1 1 1 1 | 1 1 1 1 | 1 1 1 1 | 1 1 1 1 |
| B | 0 1 1 | 1 1 1 1 | 1 1 1 1 | 1 1 1 1 | 1 1 1 1 | 1 1 1 1 |
| C | 1 0 1 | 1 1 1 1 | 1 1 1 1 | 1 1 1 1 | 1 1 1 1 | 1 1 1 1 |
| D | 0 0 1 | 1 1 1 1 | 1 1 1 1 | 1 1 1 1 | 1 1 1 1 | 0 0 0 0 |
| E | 1 1 0 | 1 1 1 1 | 1 1 1 1 | 0 0 0 0 | 0 0 0 0 | 1 1 1 1 |
| F | 0 1 0 | 1 1 1 1 | 0 0 0 0 | 1 1 1 1 | 0 0 0 0 | 1 1 1 1 |
| G | 1 0 0 | 1 1 0 0 | 1 1 0 0 | 1 1 0 0 | 1 1 0 0 | 1 1 0 0 |
| H | 0 0 0 | 1 0 1 0 | 1 0 1 0 | 1 0 1 0 | 1 0 1 0 | 1 0 1 0 |
| | | ↑ ABCDEFGH | ↑ ABCDEGH | ↑ ABCDFGH | ↑ ABCDGH | ↑ ABCEFGH |

FIG. 8

| | p q r | | | | | |
|---|---|---|---|---|---|---|
| A | 1 1 1 | 0 0 0 0 | 0 0 0 0 | 0 0 0 0 | 0 0 0 0 | 0 0 0 0 |
| B | 0 1 1 | 1 1 1 1 | 1 1 1 1 | 1 1 1 1 | 1 1 1 1 | 1 1 1 1 |
| C | 1 0 1 | 1 1 1 1 | 1 1 1 1 | 1 1 1 1 | 1 1 1 1 | 1 1 1 1 |
| D | 0 0 1 | 1 1 1 1 | 1 1 1 1 | 1 1 1 1 | 1 1 1 1 | 0 0 0 0 |
| E | 1 1 0 | 1 1 1 1 | 1 1 1 1 | 0 0 0 0 | 0 0 0 0 | 1 1 1 1 |
| F | 0 1 0 | 1 1 1 1 | 0 0 0 0 | 1 1 1 1 | 0 0 0 0 | 1 1 1 1 |
| G | 1 0 0 | 1 1 0 0 | 1 1 0 0 | 1 1 0 0 | 1 1 0 0 | 1 1 0 0 |
| H | 0 0 0 | 1 0 1 0 | 1 0 1 0 | 1 0 1 0 | 1 0 1 0 | 1 0 1 0 |
| | | ↑ BCDEFGH | | | | ↑ BCEFGH |

FIG. 4

| | | | | | | |
|---|---|---|---|---|---|---|
| A | 1 1 1 1 | 1 1 1 1 | 1 1 1 1 | 1 1 1 1 | 1 1 1 1 | 1 1 1 1 |
| B | 1 1 1 1 | 1 1 1 1 | 1 1 1 1 | 1 1 1 1 | 1 1 1 1 | 1 1 1 1 |
| C | 1 1 1 1 | 1 1 1 1 | 1 1 1 1 | 0 0 0 0 | 0 0 0 0 | 0 0 0 0 |
| D | 0 0 0 0 | 0 0 0 0 | 0 0 0 0 | 1 1 1 1 | 1 1 1 1 | 1 1 1 1 |
| E | 1 1 1 1 | 0 0 0 0 | 0 0 0 0 | 1 1 1 1 | 1 1 1 1 | 0 0 0 0 |
| F | 0 0 0 0 | 1 1 1 1 | 0 0 0 0 | 1 1 1 1 | 0 0 0 0 | 1 1 1 1 |
| G | 1 1 0 0 | 1 1 0 0 | 1 1 0 0 | 1 1 0 0 | 1 1 0 0 | 1 1 0 0 |
| H | 1 0 1 0 | 1 0 1 0 | 1 0 1 0 | 1 0 1 0 | 1 0 1 0 | 1 0 1 0 |

↑ABCEGH                                    ↑ABDFGH

FIG. 9

| | | | | | | |
|---|---|---|---|---|---|---|
| A | 0 0 0 0 | 0 0 0 0 | 0 0 0 0 | 0 0 0 0 | 0 0 0 0 | 0 0 0 0 |
| B | 1 1 1 1 | 1 1 1 1 | 1 1 1 1 | 1 1 1 1 | 1 1 1 1 | 1 1 1 1 |
| C | 1 1 1 1 | 1 1 1 1 | 1 1 1 1 | 0 0 0 0 | 0 0 0 0 | 0 0 0 0 |
| D | 0 0 0 0 | 0 0 0 0 | 0 0 0 0 | 1 1 1 1 | 1 1 1 1 | 1 1 1 1 |
| E | 1 1 1 1 | 0 0 0 0 | 0 0 0 0 | 1 1 1 1 | 1 1 1 1 | 0 0 0 0 |
| F | 0 0 0 0 | 1 1 1 1 | 0 0 0 0 | 1 1 1 1 | 0 0 0 0 | 1 1 1 1 |
| G | 1 1 0 0 | 1 1 0 0 | 1 1 0 0 | 1 1 0 0 | 1 1 0 0 | 1 1 0 0 |
| H | 1 0 1 0 | 1 0 1 0 | 1 0 1 0 | 1 0 1 0 | 1 0 1 0 | 1 0 1 0 |

↑BCEGH                                     ↑BDFGH

April 3, 1962  B. DUNHAM  3,028,088
MULTIPURPOSE LOGICAL OPERATIONS
Filed Sept. 25, 1956  23 Sheets-Sheet 5

FIG. 5

| | | | | | | | |
|---|---|---|---|---|---|---|---|
| A | 1111 | 1111 | 1111 | 1111 | 1111 | 1111 | 1111 |
| B | 1111 | 1111 | 1111 | 1111 | 1111 | 0000 | 0000 |
| C | 0000 | 0000 | 0000 | 0000 | 0000 | 1111 | 1111 |
| D | 1111 | 0000 | 0000 | 0000 | 0000 | 1111 | 1111 |
| E | 0000 | 1111 | 1111 | 0000 | 0000 | 1111 | 1111 |
| F | 0000 | 1111 | 0000 | 1111 | 0000 | 1111 | 0000 |
| G | 1100 | 1100 | 1100 | 1100 | 1100 | 1100 | 1100 |
| H | 1010 | 1010 | 1010 | 1010 | 1010 | 1010 | 1010 |

↑ABDGH  ↑ACDEGH

FIG. 10

| | | | | | | | |
|---|---|---|---|---|---|---|---|
| A | 0000 | 0000 | 0000 | 0000 | 0000 | 0000 | 0000 |
| B | 1111 | 1111 | 1111 | 1111 | 1111 | 0000 | 0000 |
| C | 0000 | 0000 | 0000 | 0000 | 0000 | 1111 | 1111 |
| D | 1111 | 0000 | 0000 | 0000 | 0000 | 1111 | 1111 |
| E | 0000 | 1111 | 1111 | 0000 | 0000 | 1111 | 1111 |
| F | 0000 | 1111 | 0000 | 1111 | 0000 | 1111 | 0000 |
| G | 1100 | 1100 | 1100 | 1100 | 1100 | 1100 | 1100 |
| H | 1010 | 1010 | 1010 | 1010 | 1010 | 1010 | 1010 |

↑BDGH  ↑CDEGH

April 3, 1962    B. DUNHAM    3,028,088
MULTIPURPOSE LOGICAL OPERATIONS
Filed Sept. 25, 1956    23 Sheets-Sheet 6

FIG. 6

| | | | | | | | |
|---|---|---|---|---|---|---|---|
| A | 1 1 1 1 | 1 1 1 1 | 1 1 1 1 | 1 1 1 1 | 1 1 1 1 | 1 1 1 1 | 1 1 1 1 |
| B | 0 0 0 0 | 0 0 0 0 | 0 0 0 0 | 0 0 0 0 | 0 0 0 0 | 0 0 0 0 | 0 0 0 0 |
| C | 1 1 1 1 | 1 1 1 1 | 1 1 1 1 | 1 1 1 1 | 1 1 1 1 | 1 1 1 1 | 0 0 0 0 |
| D | 1 1 1 1 | 1 1 1 1 | 0 0 0 0 | 0 0 0 0 | 0 0 0 0 | 0 0 0 0 | 1 1 1 1 |
| E | 0 0 0 0 | 0 0 0 0 | 1 1 1 1 | 1 1 1 1 | 0 0 0 0 | 0 0 0 0 | 1 1 1 1 |
| F | 1 1 1 1 | 0 0 0 0 | 1 1 1 1 | 0 0 0 0 | 1 1 1 1 | 0 0 0 0 | 1 1 1 1 |
| G | 1 1 0 0 | 1 1 0 0 | 1 1 0 0 | 1 1 0 0 | 1 1 0 0 | 1 1 0 0 | 1 1 0 0 |
| H | 1 0 1 0 | 1 0 1 0 | 1 0 1 0 | 1 0 1 0 | 1 0 1 0 | 1 0 1 0 | 1 0 1 0 |

↑ ACDFGH                          ↑ ADEFGH

FIG. 11

| | | | | | | | |
|---|---|---|---|---|---|---|---|
| A | 0 0 0 0 | 0 0 0 0 | 0 0 0 0 | 0 0 0 0 | 0 0 0 0 | 0 0 0 0 | 0 0 0 0 |
| B | 0 0 0 0 | 0 0 0 0 | 0 0 0 0 | 0 0 0 0 | 0 0 0 0 | 0 0 0 0 | 0 0 0 0 |
| C | 1 1 1 1 | 1 1 1 1 | 1 1 1 1 | 1 1 1 1 | 1 1 1 1 | 1 1 1 1 | 0 0 0 0 |
| D | 1 1 1 1 | 1 1 1 1 | 0 0 0 0 | 0 0 0 0 | 0 0 0 0 | 0 0 0 0 | 1 1 1 1 |
| E | 0 0 0 0 | 0 0 0 0 | 1 1 1 1 | 1 1 1 1 | 0 0 0 0 | 0 0 0 0 | 1 1 1 1 |
| F | 1 1 1 1 | 0 0 0 0 | 1 1 1 1 | 0 0 0 0 | 1 1 1 1 | 0 0 0 0 | 1 1 1 1 |
| G | 1 1 0 0 | 1 1 0 0 | 1 1 0 0 | 1 1 0 0 | 1 1 0 0 | 1 1 0 0 | 1 1 0 0 |
| H | 1 0 1 0 | 1 0 1 0 | 1 0 1 0 | 1 0 1 0 | 1 0 1 0 | 1 0 1 0 | 1 0 1 0 |

↑ CDFGH                         ↑ DEFGH

April 3, 1962     B. DUNHAM     3,028,088
MULTIPURPOSE LOGICAL OPERATIONS
Filed Sept. 25, 1956     23 Sheets-Sheet 7

FIG. 7

| | | | | | | | |
|---|---|---|---|---|---|---|---|
| A | 1111 | 1111 | 1111 | 1111 | 1111 | 1111 | 1111 |
| B | 0000 | 0000 | 0000 | 0000 | 0000 | 0000 | 0000 |
| C | 0000 | 0000 | 0000 | 0000 | 0000 | 0000 | 0000 |
| D | 1111 | 1111 | 1111 | 0000 | 0000 | 0000 | 0000 |
| E | 1111 | 0000 | 0000 | 1111 | 1111 | 0000 | 0000 |
| F | 0000 | 1111 | 0000 | 1111 | 0000 | 1111 | 0000 |
| G | 1100 | 1100 | 1100 | 1100 | 1100 | 1100 | 1100 |
| H | 1010 | 1010 | 1010 | 1010 | 1010 | 1010 | 1010 |

↑ ADEGH                                                                                 ↑ AGH

FIG. 12

| | | | | | | | |
|---|---|---|---|---|---|---|---|
| A | 0000 | 0000 | 0000 | 0000 | 0000 | 0000 | 0000 |
| B | 0000 | 0000 | 0000 | 0000 | 0000 | 0000 | 0000 |
| C | 0000 | 0000 | 0000 | 0000 | 0000 | 0000 | 0000 |
| D | 1111 | 1111 | 1111 | 0000 | 0000 | 0000 | 0000 |
| E | 1111 | 0000 | 0000 | 1111 | 1111 | 0000 | 0000 |
| F | 0000 | 1111 | 0000 | 1111 | 0000 | 1111 | 0000 |
| G | 1100 | 1100 | 1100 | 1100 | 1100 | 1100 | 1100 |
| H | 1010 | 1010 | 1010 | 1010 | 1010 | 1010 | 1010 |

↑ DEGH                                                               ↑ GH    ↑ -(ABCDEFGH)

April 3, 1962    B. DUNHAM    3,028,088
MULTIPURPOSE LOGICAL OPERATIONS
Filed Sept. 25, 1956    23 Sheets-Sheet 8

FIG. 13

| A<br>GUIDE<br>BASIC GROUP<br>(ABCDEFGH) | B<br>FIRST<br>SIMPLIFICATION | C<br>↓ SIMPLIFICATION | D<br>\| SIMPLIFICATION | E<br>□ SIMPLIFICATION | F<br>INTERCHANGE<br>EQUIVALENTS | G<br>MCE SLE | H<br>MCE SLE |
|---|---|---|---|---|---|---|---|
| (1) −(ABCDEFGH) |  |  |  |  |  | 0 | 0 |
| (2) A | p · p̄ |  |  |  |  | 2 | 3 |
| (3) B | p · q · r |  |  |  | C, E | 2 | 3 |
| (4) D | p̄ · q · r |  | p↓(q\|r) |  | F, G | 2 | 3 |
| (5) H | −(p∨q) · r |  |  |  |  | 2 | 3 |
| (6) AB | −(p∨q∨r) | q · r |  |  |  | 2 | 3 |
| (7) AD | r · (p≡q) | r · (p↓q) |  |  | AC, AE | 1 | 2 |
| (8) AH | (p≡q) · (p≡r) | p↓(q∨r) |  |  | AF, AG | 2 | 3 |
| (9) BC | r · (p↯q) |  |  |  | BE, CE | 2 | 3 |
| (10) BD | p̄ · r |  |  |  | BF, CD, CG, EF, EG | 2 | 2 |
| (11) BG | (p↯q)·(p↯r) | p↓(q≡r) |  |  | CF, DE | 2 | 4 |
| (12) BH | p̄ · (q≡r) | p↓(q↯r) |  |  | CH, EH | 2 | 3 |
| (13) DF | p̄ · (q↯r) | p↓q |  |  | DG, FG | 2 | 3 |
| (14) DH | −(p∨q) |  |  |  | FH, GH | 1 | 2 |
| (15) ABC | r · (p∨q) |  |  |  | ABE, ACE | 2 | 3 |
| (16) ABD | r · (p̄∨q) |  |  | p↯q↯r | ABF, ACD, ACG, AEF, AEG | 2 | 4 |
| (17) ABG | (p∨q)·(q≡r) |  |  | (...)≡ p̄ | ACF, ADE | 3 | 4 |
| (18) ABH | r≡(q∨(p·r)) |  |  | (...)·(q∨r) | ACH, AEH | 3 | 4 |
| (19) ADF | (p≡(q·r))·(q∨r) |  |  | (...)≡(q∨r) | ADG, AFG | 3 | 4 |
| (20) ADH | p≡(q·(p∨r)) |  |  |  | AFH, AGH | 3 | 4 |

April 3, 1962  B. DUNHAM  3,028,088
MULTIPURPOSE LOGICAL OPERATIONS
Filed Sept. 25, 1956  23 Sheets-Sheet 9

FIG. 14

| | | | | | |
|---|---|---|---|---|---|
| (21) BCD | $r \cdot - (p \cdot q)$ | $r \cdot (p|q)$ | | BEF, CEG | 2 | 3 |
| (22) BCE | $(p \nleftarrow (q \cdot r)) \cdot (q \vee r)$ | | | BCG, BDE, BEG, CDE, CEF | 3 | 5 |
| (23) BCF | $q \nleftarrow (p \cdot (q \vee r))$ | | | BEH, CEH | 3 | 4 |
| (24) BCH | $(r \equiv (p \vee q)) \cdot - (p \cdot q)$ | $(r \nleftarrow (p \vee q)) \downarrow (p \cdot q)$ | | CDG, EFG | 3 | 5 |
| (25) BDF | $\bar{p} \cdot (q \vee r)$ | $p \downarrow (q \downarrow r)$ | | | 2 | 3 |
| (26) BDG | $p \nleftarrow (r \vee (p \cdot q))$ | | | BFG, CDF, CFG, DEF, DEG | 3 | 4 |
| (27) BDH | $\bar{p} \cdot (\bar{q} \vee r)$ | $p \downarrow (q \cdot \bar{r})$ | | BFH, CDH, CGH, EFH, EGH | 3 | 3 |
| (28) BGH | $-(q \cdot p) \cdot (q \equiv r)$ | $(q \cdot p) \downarrow (q \nleftarrow r)$ | | CFH, DEH | 3 | 4 |
| (29) DFG | $(r \nleftarrow (p \vee q)) \cdot -(p \cdot q)$ | $(r \equiv (p \vee q)) \downarrow (p \cdot q)$ | | DGH, FGH | 3 | 5 |
| (30) DFH | $-(p \vee (q \cdot r))$ | $p \downarrow (q \cdot r)$ | | | 2 | 3 |
| (31) ABCD | $r$ | | | ABEF, ACEG | 0 | 1 |
| (32) ABCE | $(q \cdot r) \nleftarrow (p \cdot (q \nleftarrow r))$ | | | | 1 | 3 |
| (33) ABCF | $r \equiv (p \vee (q \equiv r))$ | | | ABCG, ABDE, ABEG, ACDE, ACEF | 2 | 4 |
| (34) ABCH | $r \equiv (p \vee q)$ | | | ABEH, ACEH | 2 | 3 |
| (35) ABDF | $(q \cdot r) \equiv (p \vee (q \equiv r))$ | | | ACDG, AEFG | 2 | 3 |
| (36) ABDG | $r \nleftarrow (p \cdot \bar{q})$ | | | ABFG, ACDF, ACFG, ADEF, ADEG | 2 | 4 |
| (37) ABDH | $(q \vee p) \equiv (q \cdot r)$ | | | ABFH, ACDH, ACGH, AEFH, AEGH | 3 | 4 |
| (38) ABGH | $q \equiv r$ | | | ACFH, ADEH | 1 | 2 |
| (39) ADFG | $p \nleftarrow q \nleftarrow r$ | | | | 1 | 3 |
| (40) ADFH | $p \equiv (q \cdot r)$ | | | ADGH, AFGH | 2 | 3 |

FIG. 15

April 3, 1962          B. DUNHAM          3,028,088
MULTIPURPOSE LOGICAL OPERATIONS
Filed Sept. 25, 1956                      23 Sheets-Sheet 11

FIG. 16

| | | | | | | |
|---|---|---|---|---|---|---|
| (61) BCDEF | $(\bar{q} \cdot p) \vee (q \nrightarrow r)$ | | | BCDEG, BCEFG | 3 | 4 |
| (62) BCDEH | $(r \nrightarrow (p \cdot q)) \vee -(p \vee q)$ | $(r \nrightarrow (p \cdot q)) \vee (p \downarrow q)$ | | BCEFH, BCEGH | 3 | 5 |
| (63) BCDFG | $(\bar{p} \cdot r) \vee (p \nrightarrow q)$ | | | BDEFG, CDEFG | 3 | 4 |
| (64) BCDFH | $\bar{p} \vee (\bar{q} \cdot r)$ | | $p \| (q \vee \bar{r})$ | BCDGH, BDEFH, BEFGH, CDEGH, CEFGH | 3 | 3 |
| (65) BCDGH | $-(p \vee r) \vee (p \nrightarrow q)$ | $(p \downarrow r) \vee (p \nrightarrow q)$ | | BDEGH, CDEFH | 3 | 4 |
| (66) BDFGH | $-(p \cdot (q \vee r))$ | | $p \| (q \vee r)$ | CDFGH, DEFGH | 2 | 3 |
| (67) ABCDEF | $q \vee r$ | | | ABCDEG, ABCEFG | 1 | 2 |
| (68) ABCDEH | $r \vee (p \equiv q)$ | | | ABCEFH, ABCEGH | 2 | 3 |
| (69) ABCDFG | $r \vee (p \nrightarrow q)$ | | | ABDEFG, ACDEFG | 2 | 3 |
| (70) ABCDFH | $\bar{p} \vee r$ | | | ABCDGH, ABDEFH, ABEFGH, ACDEGH, ACEFGH | 2 | 2 |
| (71) ABCFGH | $(r \equiv p) \vee (r \equiv q)$ | | $p \| (q \nrightarrow r)$ | ABDEGH, ACDEFH | 2 | 4 |
| (72) ABDFGH | $\bar{p} \vee (q \equiv r)$ | | | ACDFGH, ADEFGH | 2 | 3 |
| (73) BCDEFG | $(p \nrightarrow q) \vee (p \nrightarrow r)$ | | $p \| (q \equiv r)$ | BCDEGH, BCEFGH | 2 | 3 |
| (74) BCDEFH | $\bar{p} \vee (q \nrightarrow r)$ | | $p \| q$ | BDEFGH, CDEFGH | 2 | 3 |
| (75) BCDFGH | $-(p \cdot q)$ | | | | 1 | 2 |
| (76) ABCDEFG | $p \vee q \vee r$ | | $(q \downarrow r) \| p$ | ABCDEGH, ABCEFGH | 2 | 3 |
| (77) ABCDEFH | $q \vee r \vee \bar{p}$ | | $(p \| q) \vee r$ | | 2 | 3 |
| (78) ABCDFGH | $-(p \cdot q) \vee r$ | | $p \| (q \cdot r)$ | ABDEFGH, ACDEFGH | 2 | 3 |
| (79) BCDEFGH | $-(p \cdot q \cdot r)$ | | $p \| (q \cdot r)$ | | 2 | 3 |
| (80) ABCDEFGH | $p \vee \bar{p}$ | | | | 0 | 0 |

April 3, 1962  B. DUNHAM  3,028,088
MULTIPURPOSE LOGICAL OPERATIONS
Filed Sept. 25, 1956  23 Sheets-Sheet 12

April 3, 1962   B. DUNHAM   3,028,088
MULTIPURPOSE LOGICAL OPERATIONS
Filed Sept. 25, 1956   23 Sheets-Sheet 14
FIG. 17
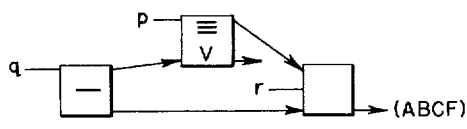
FIG. 25
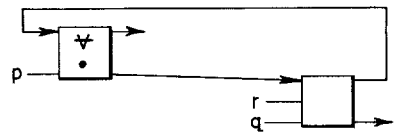
FIG. 18
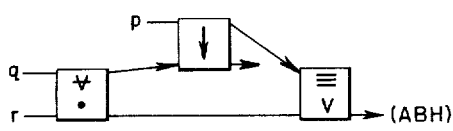
FIG. 26
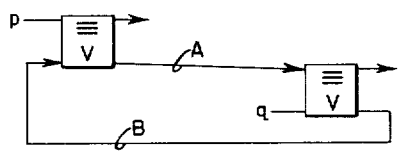
FIG. 21
FIG. 27
FIG. 22
FIG. 28
FIG. 23
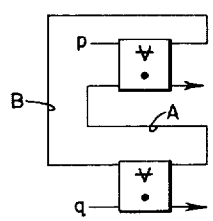
FIG. 29
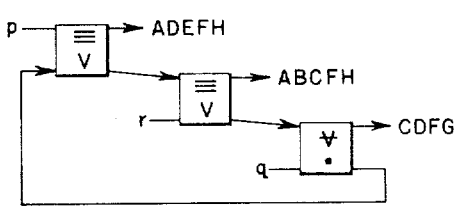
FIG. 24
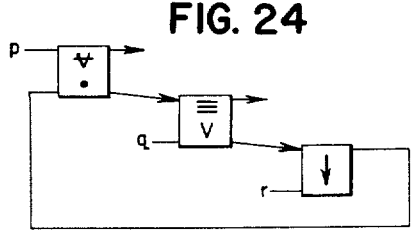
FIG. 30
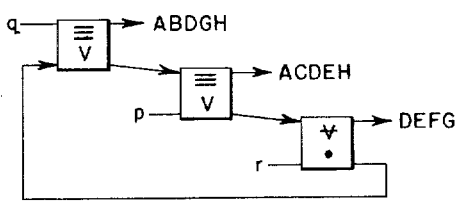

April 3, 1962  B. DUNHAM  3,028,088
MULTIPURPOSE LOGICAL OPERATIONS
Filed Sept. 25, 1956  23 Sheets-Sheet 15

April 3, 1962  B. DUNHAM  3,028,088
MULTIPURPOSE LOGICAL OPERATIONS
Filed Sept. 25, 1956  23 Sheets-Sheet 16

April 3, 1962  B. DUNHAM  3,028,088
MULTIPURPOSE LOGICAL OPERATIONS
Filed Sept. 25, 1956  23 Sheets-Sheet 17

FIG. 38

| GUIDE BASIC GROUP | | CODE EQUIVALENT ①②③④⑤⑥-OUTPUT | CONCURRENT OUTPUTS | |
|---|---|---|---|---|
| (1) | -(ABCDEFGH) | p q 0 r 0 0    Y | X ABCFG, | Z BCDE |
| (2) | A | p q 1 r 0 0    Y | X BCDEH, | Z DEFG |
| (3) | B | p 1 0 q r 0    Y | X ACDEFH, | Z ADFG |
| (6) | AB | q 0 0 0 0 r    Y | X CDEF, | Z-(ABCDEFGH) |
| (7) | AD | p q 1 0 0 r    Y | X BCEH, | Z ABCEFG |
| (8) | AH | p q r 1 0 1    X | Y ABCDEFG, | Z DFGH |
| (9) | BC | p q 0 0 0 r    Y | X ADFG, | Z AE |
| (10) | BD | p 1 0 0 0 r    Y | X ACFH, | Z ACEG |
| (11) | BG | p 1 0 q r 1    X | Y ABCDEFH, | Z ADFG |
| (14) | DH | 1 1 1 p q 0    X | Y ABCEFG, | Z ADEH |
| (15) | ABC | p q 0 1 0 r    Y | X DEFG, | Z BCDFGH |
| (16) | ABD | p 1 0 q 0 r    Y | X CEFH, | Z BCFG |
| (17) | ABG | q r 1 p 1 1    X | Y ABCDEFGH, | Z ACEH |
| (19) | ADF | q r 1 p 0 1    X | Y ABCEGH, | Z BDFG |
| (24) | BCH | p q 0 r 1 1    X | Y ABCDEFG, | Z AFGH |
| (28) | BGH | q r 0 p 0 1    X | Y ACDEF, | Z BCEG |
| (31) | ABCD | r 1 0 0 0 0    Z | X EFGH, | Y-(ABCDEFGH) |
| (32) | ABCE | p 0 0 q 1 r    Y | X ADFG, | Z CDGH |
| (34) | ABCH | p q 1 r 1 1    Z | X ADE, | Y ABCDEFG |
| (38) | ABGH | q 1 0 r 1 p    Z | X BCFH, | Y ACDEG |
| (39) | ADFG | p 1 0 q r 1    Z | X BG, | Y ABCDEFH |
| (40) | ADFH | q r 0 p 1 1    Z | X CEH, | Y ABCDEFG |
| (41) | BCDE | p q 0 r 0 0    Z | X ABCFG, | Y-(ABCDEFGH) |
| (44) | BCEH | p q r 0 0 1    X | Y ADFG, | Z ABCE |
| (45) | BCFG | p 1 0 q 0 1    Z | X CG, | Y ABDEFH |
| (46) | BCFH | q 1 0 r 1 p    X | Y ACDEG, | Z ABGH |
| (47) | BDFG | q r 1 p 0 1    Z | X ADF, | Y ABCEGH |
| (48) | BDFH | p 1 0 0 0 0    X | Y-(ABCDEFGH), | Z ACEG |
| (50) | DFGH | p q r 1 0 1    Z | X AH, | Y ABCDEFG |
| (51) | ABCDE | r 0 0 p q 1    Y | X AFGH, | Z BCFG |
| (52) | ABCDF | p 1 0 q 1 r    Y | X BEGH, | Z ADEH |
| (55) | ABCFG | p q 0 r 0 1    Y | X DEH, | Z BCDE |
| (57) | ABDFG | q r 0 p 1 0    X | Y CE, | Z ADFH |
| (62) | BCDEH | p q 1 r 0 0    X | Y A, | Z DEFG |
| (65) | BCFGH | p q 1 r 1 0    X | Y ADE, | Z ABCH |
| (67) | ABCDEF | q 1 1 1 1 r    Y | X ABGH, | Z ABCDEFG |
| (68) | ABCDEH | p q 1 r 0 1    Y | X AFG, | Z DEFG |
| (69) | ABCDFG | p q 0 1 1 r    Y | X BCEH, | Z AE |
| (70) | ABCDFH | p 1 0 1 1 r    Y | X BDEG, | Z ACEG |
| (71) | ABCFGH | r 1 0 p q 0    X | Y E, | Z ADFG |
| (73) | ABCFGH | p q r 1 0 0    X | Y A, | Z DFGH |
| (75) | BCDFGH | p q 0 1 0 1    Z | X DH, | Y ABCEFG |
| (76) | ABCDEFG | p q 0 r 1 1    Y | X BCH, | Z AFGH |
| (77) | ABCDEFH | p 1 0 q r 1    Y | X BG, | Z ADFG |
| (80) | ABCDEFGH | p q 1 r 1 1    Y | X ADE, | Z ABCH |

FIG. 40

| GUIDE BASIC GROUP | CODE EQUIVALENT ①②③④⑤⑥⑦⑧ INPUT | OUTPUT | GUIDE BASIC GROUP | CODE EQUIVALENT ①②③④⑤⑥⑦⑧ INPUT | OUTPUT |
|---|---|---|---|---|---|
| (1) -(ABCDEFGH) | 1 0 0 p q r 0 0 | Z | (41) BCDE | 0 0 0 p q r 0 0 | Y |
| (2) A | 1 0 0 p q r 0 0 | X | (42)*BCDF | p q r q 0 r 0 1 | Y |
| (3) B | 0 0 0 p 1 q r 0 | X | (43) BCDH | r 1 0 p q 1 0 0 | Y |
| (4)*D | p q r r 0 p 1 q | W | (44) BCEH | p q 1 r 0 0 0 0 | W |
| (5)*H | p q 0 p q r 1 1 | W | (45) BCFG | 0 0 0 p 0 r 0 q | W |
| (6) AB | 0 0 0 q 0 p 0 r | X | (46) BCFH | 0 0 0 r 1 q 0 p | W |
| (7) AD | p q 1 r 0 0 0 0 | Y | (47) BDFG | 1 0 0 q r p 0 0 | Y |
| (8) AH | p 0 0 q r 1 0 1 | W | (48) BDFH | p 0 0 1 0 0 0 0 | W |
| (9) BC | 0 0 0 p q r 1 0 | X | (49)*BDGH | p q r 1 0 r 0 p | W |
| (10) BD | p 1 0 r 0 0 0 0 | Y | (50) DFGH | p 0 0 q r 1 0 1 | Y |
| (11) BG | 0 0 0 p 1 q r 1 | W | (51) ABCDE | 0 0 0 1 0 p q r | X |
| (12) BH | q r 0 p 1 1 0 0 | Y | (52) ABCDF | 0 0 0 p 1 q 1 r | X |
| (13) DF | q r 1 p 1 1 0 0 | Y | (53)*ABCDH | 1 0 0 q r p 1 q | W |
| (14) DH | 1 0 0 p q 1 0 0 | Y | (54)*ABCEH | p 1 0 q r p 0 0 | W |
| (15) ABC | 0 0 0 p q 1 0 r | X | (55) ABCFG | 0 0 0 p q r 0 1 | X |
| (16) ABD | 0 0 0 p 1 q 0 r | X | (56) ABCFH | p 1 0 r 0 q 0 1 | X |
| (17) ABG | 1 0 0 q r p 1 1 | W | (57) ABDFG | 0 0 0 q r p 1 0 | W |
| (18)*ABH | 1 0 0 q r p 0 p | W | (58) ABDFH | p 1 0 0 0 q r 1 | X |
| (19) ADF | 1 0 0 q r p 0 1 | W | (59) ABDGH | r 1 0 q 1 p 1 0 | W |
| (20)*ADH | r 0 0 p q r 1 1 | W | (60)*ADFGH | p 1 0 q r p 1 0 | W |
| (21)*BCD | 0 0 0 q r p 0 q | W | (61)*BCDEF | 0 0 0 q r p 1 p | W |
| (22)*BCE | p 1 0 q r p 1 0 | X | (62) BCDEH | 1 0 0 p q r 0 0 | W |
| (23) BCF | p 1 0 q 1 r 1 0 | X | (63)*BCDFG | r 0 0 p q r 0 0 | W |
| (24) BCH | 0 0 0 p q r 1 1 | W | (64)*BCDFH | q 1 0 p 0 r 0 q | W |
| (25) BDF | p 1 0 1 1 q r 0 | X | (65) BCFGH | 1 0 0 p q r 1 0 | W |
| (26) BDG | r 1 0 p 0 q 0 1 | W | (66)*BDFGH | p 1 0 q 1 r 1 q | W |
| (27)*BDH | q 1 0 p 1 r 1 q | W | (67) ABCDEF | q r 1 0 0 0 0 0 | Z |
| (28) BGH | 0 0 0 q r p 0 1 | W | (68) ABCDEH | 1 0 0 p q r 0 1 | X |
| (29)*DFG | 0 0 0 p q r 0 r | W | (69) ABCDFG | p q 0 r 1 0 0 0 | Y |
| (30)*DFH | p 1 0 r 0 q 0 r | W | (70) ABCDFH | p 1 0 r 1 0 0 0 | Y |
| (31) ABCD | 0 0 0 p 0 r 0 q | Y | (71) ABCFGH | 0 0 0 r 1 p q 0 | W |
| (32) ABCE | p q r 0 0 0 0 0 | Z | (72) ABDFGH | q r 0 p 1 1 0 0 | W |
| (33)*ABCF | q 1 0 p 1 r 0 q | X | (73) BCDEFG | p 0 0 q r 1 0 0 | W |
| (34) ABCH | 1 0 0 p q r 1 0 | Y | (74) BCDEFH | q r 1 p 1 1 0 0 | W |
| (35) ABDF | p 1 0 q r 0 0 0 | Y | (75) BCDFGH | 1 0 0 p q 1 0 0 | W |
| (36) ABDG | p 1 0 q 1 r 1 0 | Y | (76) ABCDEFG | 0 0 0 p q r 1 1 | X |
| (37)*ABDH | p q r q 0 p 1 r | Y | (77) ABCDEFH | 0 0 0 p 1 q r 1 | X |
| (38) ABGH | q 1 0 r 0 0 0 0 | W | (78)*ABCDFGH | p q r r 1 p 0 q | W |
| (39) ADFG | 0 0 0 p 1 q r 0 | Y | (79)*BCDEFGH | p q 1 p q r 0 0 | W |
| (40) ADFH | 0 0 0 q r p 1 0 | Y | (80) ABCDEFGH | 1 1 0 p q r 0 0 | Z |

United States Patent Office 3,028,088
Patented Apr. 3, 1962

3,028,088
MULTIPURPOSE LOGICAL OPERATIONS
Bradford Dunham, Poughkeepsie, N.Y., assignor to International Business Machines Corporation, New York, N.Y., a corporation of New York
Filed Sept. 25, 1956, Ser. No. 611,922
7 Claims. (Cl. 235—164)

This invention relates to the logical relationships of information in digital information handling machines such as electronic calculators, to circuits that may be used to perform such logical relationships, and to information handling machines themselves.

In the design and construction of digital information handling machines the optimum situation would be to provide a machine having the logic with which the information is handled, performed in as few steps as possible, logically, while at the same time achieving these steps with a minimum of kinds of machine element. In practice, however, these two considerations are frequently in conflict. If many kinds of machine element are available, each element performing directly a different logical relationship of the information presented in a single step, the number of elements needed for a given situation should be relatively small. On the other hand, if the variety of kinds of machine element are so limited that only a few logical relationships are achieved directly, then the number of machine elements required will be large. The practical alternative in this situation is the use of a versatile machine element having properties such that it may be adjusted to provide a wider variety of logical relationships than have heretofore been available in the art. Groups of such elements may then be judiciously combined into machine building blocks so that all logical relationships for a given system of presented information may be performed by a single building block.

The following references and material cited therein, describe some of the logical principles to be discussed and an insight to some degree of application of these principles in the present state of the art:

Mathematical Logic, W. V. Quine, Revised Edition, Harvard Univ. Press, 1951 Synthesis of Electronic Computing and Control Circuits, Staff of the Computation Laboratory, Harvard University Press, 1951

The Design of Switching Circuits, Keister, Ritchie and Washburn, D. Van Nostrand, 1951

On a Universal Decision Element, Boleslaw Sobocinski, The Journal of Computing Systems, 1952

"Report on a New 'Decision Element' System," (June 9, 1955), The Minnesota Electronics Corp. Practical Circuits for Gating in Digital Computers, Norman R. Scott, Control Engineering, February 1956

Symbolic Logic, Binary Calculation and 3C–PACS, Robert W. Brooks, Computer Control Co., Inc. 1956.

Accordingly it is a primary object of this invention to set forth a process of information handling, involving a novel philosophy of devices and of systems of devices in which the information is handled.

Another object is to provide from a logical standpoint a multipurpose type of information handling component.

Another object is to provide from a logical standpoint a memory type of information handling component.

Another object is to provide from a logical standpoint a one stage indeterminate type of information handling component.

Another object is to provide an oscillatory type of information handling component.

Another object is to provide a logical machine building block capable of achieving all logical connectives for a given information system.

Another object is to provide an information handling circuit wherein the greatest logical generality can be achieved.

Another object is to provide an element for data processing admitting of a type of logical setup whereby, in response to a single instruction, any logical operator of a given system is achieved directly.

Another object is to provide a method of information handling wherein logic is performed merely by where information is entered and biasing.

Another object is to provide a logical information handling system wherein universal logical elements are programmed to achieve selected logical functions in response to a single operation instruction.

Another object is to provide a single logical circuit capable of achieving any one of all logical connectives for a given input system in a single step and capable in response to a single instruction to achieve any other of all such logical connectives.

A related object is to provide a logical memory circuit.

Another related object is to provide a logical oscillator circuit.

Another related object is to provide logical circuits achieving particular functions.

Another related object is to provide a pulse pattern generator.

Another related object is to provide a counter circuit.

Another related object is to provide an analog to digital converter circuit.

Another related object is to provide a novel internal checking system for data processing.

Another related object is to provide a systematic logical redundancy in data processing wherein there is no major duplication of parts.

FIGURES 3, 4, 5, 6, 7, 8, 9, 10, 11, and 12 show a table containing the system of ternary logical functions.

Figure 15:
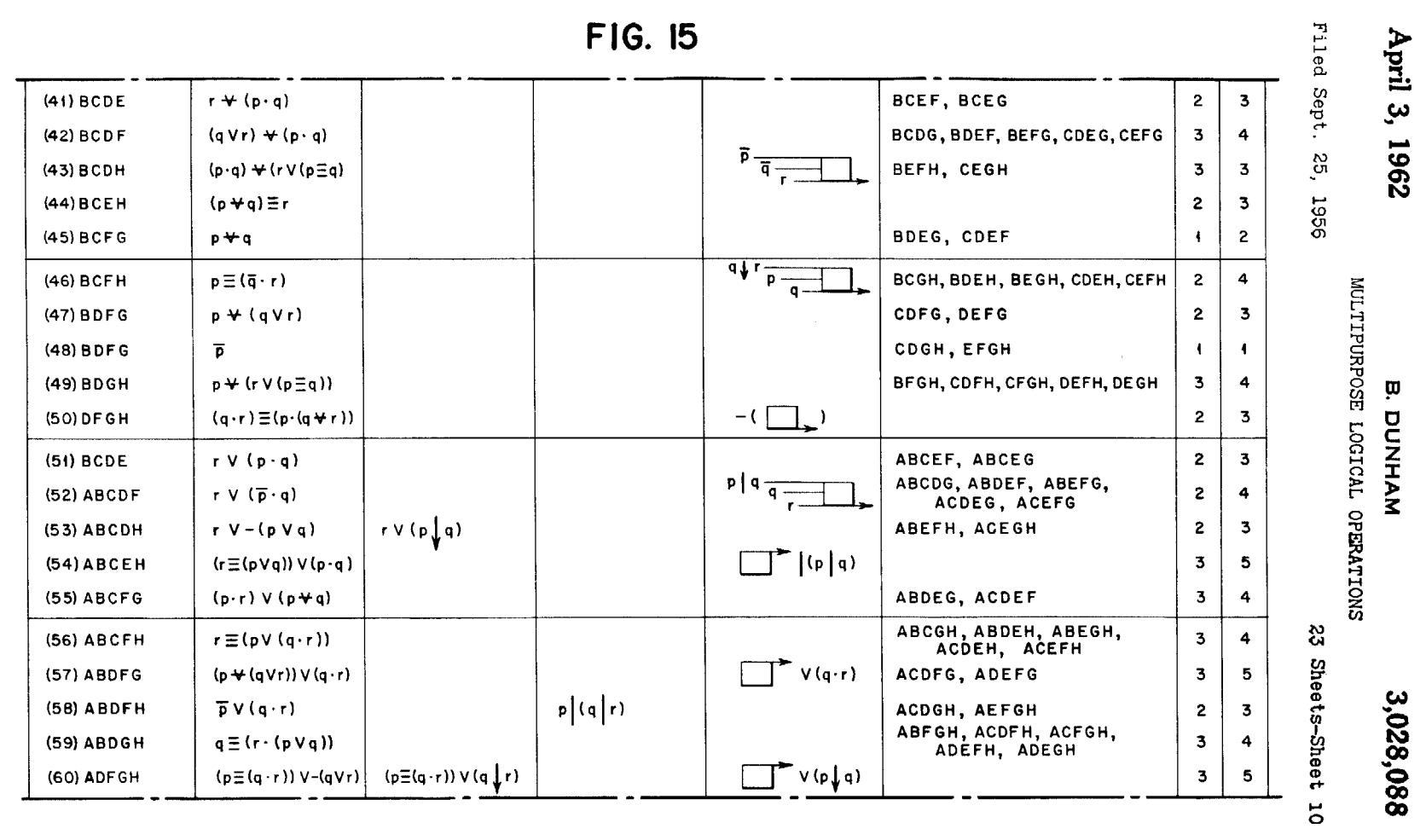

FIGURES 13, 14, 15, and 16 show the system of interchange groups for the system of ternary logical functions and show also illustrative methods for achieving each.

FIGURE 17 is an expression employing singulary, binary, and ternary operators to achieve a particular ternary operator.

FIGURE 18 is an expression employing only binary operators to achieve a particular ternary operator.

Figure 19:
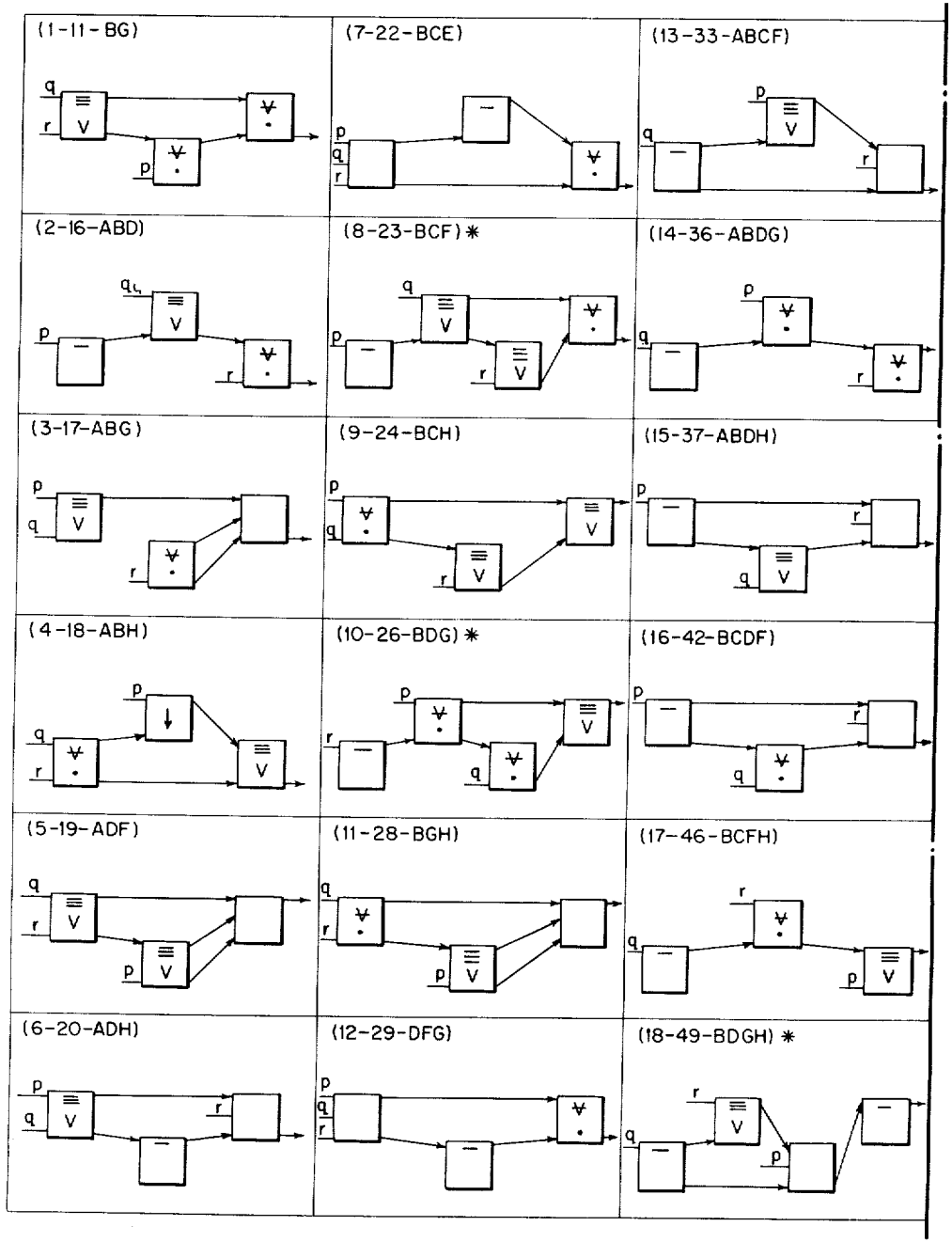
Figure 20:
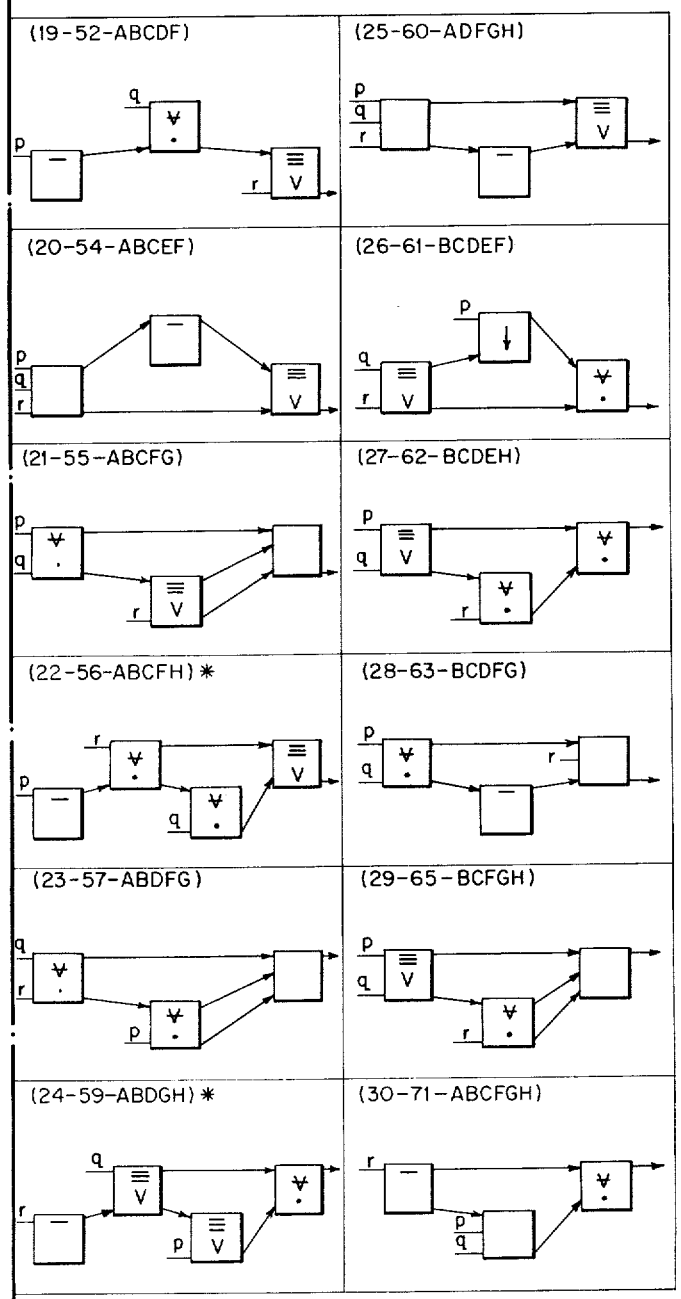

FIGURES 19 and 20 show a table of expressions wherein the ternary operators achieved in FIGURES 13, 14, 15 and 16, are achieved with a minimum of signal loads.

FIGURE 21 is an expression illustrating the advantage of the use of the binary operator | for achieving a given ternary operator.

FIGURE 22 is an expression illustrating the advantage of the use of the binary operator ↓ for achieving a given ternary operator.

FIGURE 23 is an example of a logical oscillator in all on stages.

FIGURE 24 is one example of a conditional logical oscillator.

FIGURE 25 is another example of a conditional logical oscillator.

FIGURE 26 is an illustration of a logical ambiguous feedback embodiment.

FIGURES 27 and 28 illustrate an advantage of the use of logical ambiguity for storage purposes.

FIGURES 29 and 30 illustrate uses of feedback and zero reset for purposes of achieving ternary logical functions.

Figure 31:
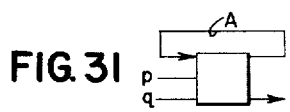

FIGURE 31 is an expression involving logical memory.

Figure 32:
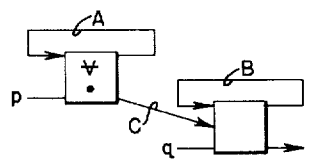

FIGURE 32 is an expression illustrating the fact that the combination of binary and ternary operators along with memory may provide a regulated pulse generator.

Figure 33:
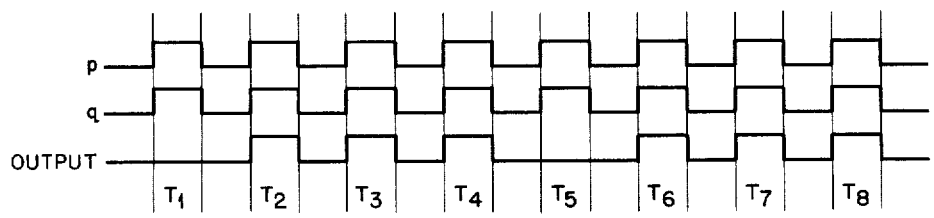

FIGURE 33 is a timing chart for the expression of FIGURE 32.

Figure 34:
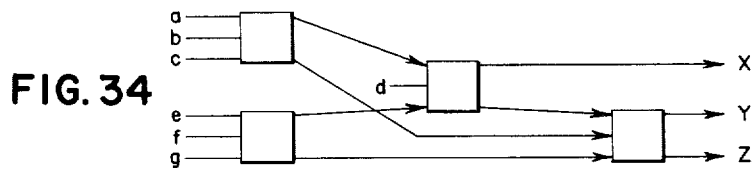

FIGURE 34 is an example of a counter which may be used as an analog to digital converter.

Figure 35:
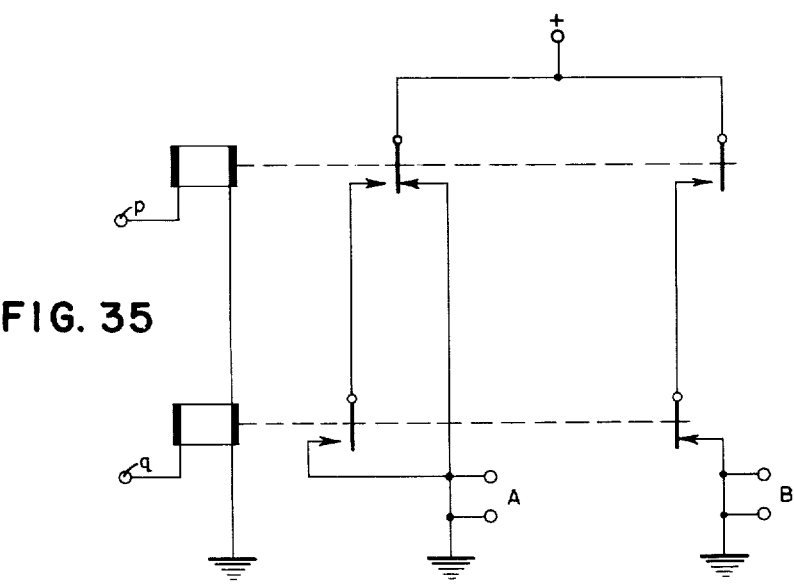

FIGURE 35 is an electromechanical physical embodiment of an elementary binary noncommutative logical device.

Figure 36:
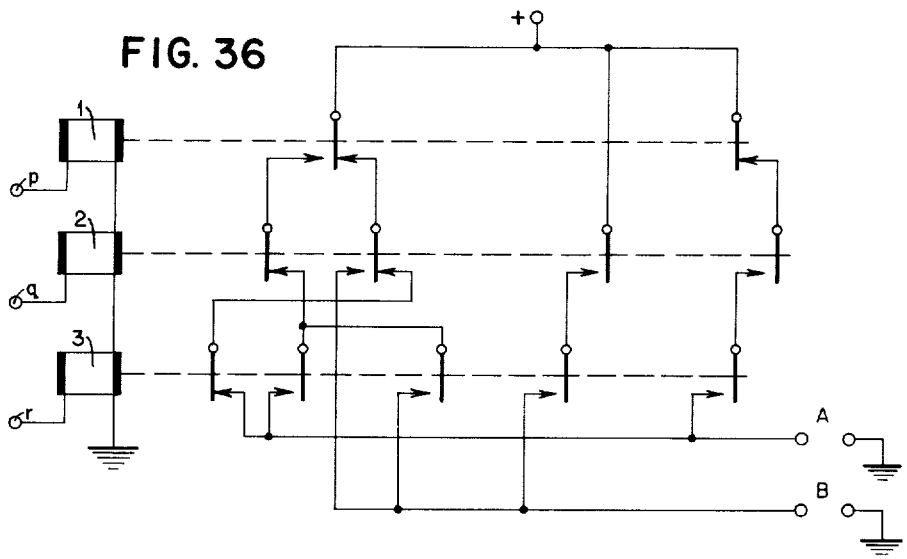

FIGURE 36 is an electromechanical physical embodiment of a device accomplishing both commutative and noncommutative full ternary operators.

Figure 37:
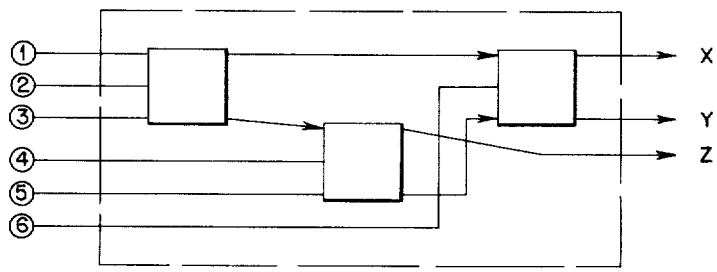

FIGURE 37 is a logical expression of three input, two output logical elements interconnected to provide a noncommutative logical device.

FIGURE 38 is a table illustrating some of the logical potentialities of a physical embodiment of the expression in FIGURE 37.

Figure 39:
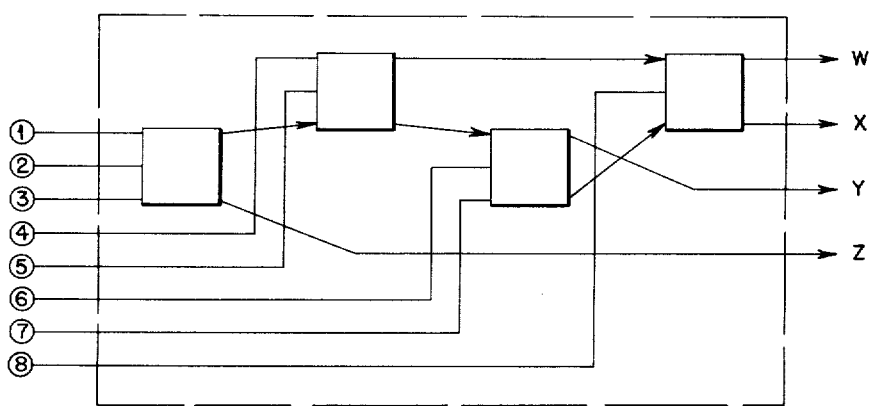

FIGURE 39 is a logical expression of a more powerful logical multipurpose bias device.

FIGURE 40 is a table illustrating some of the logical ability of the expression in FIGURE 39.

Figure 41:
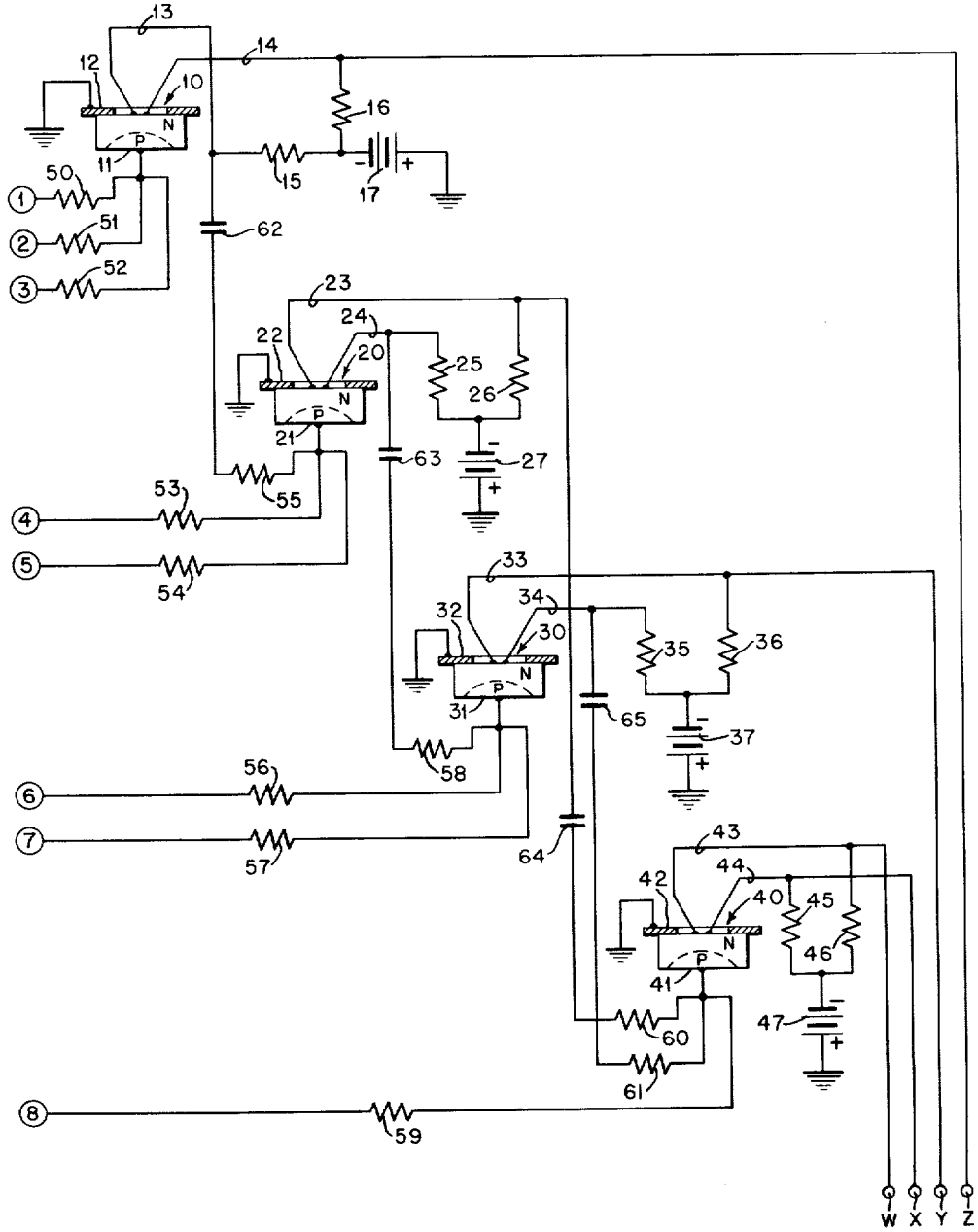
Figure 42:
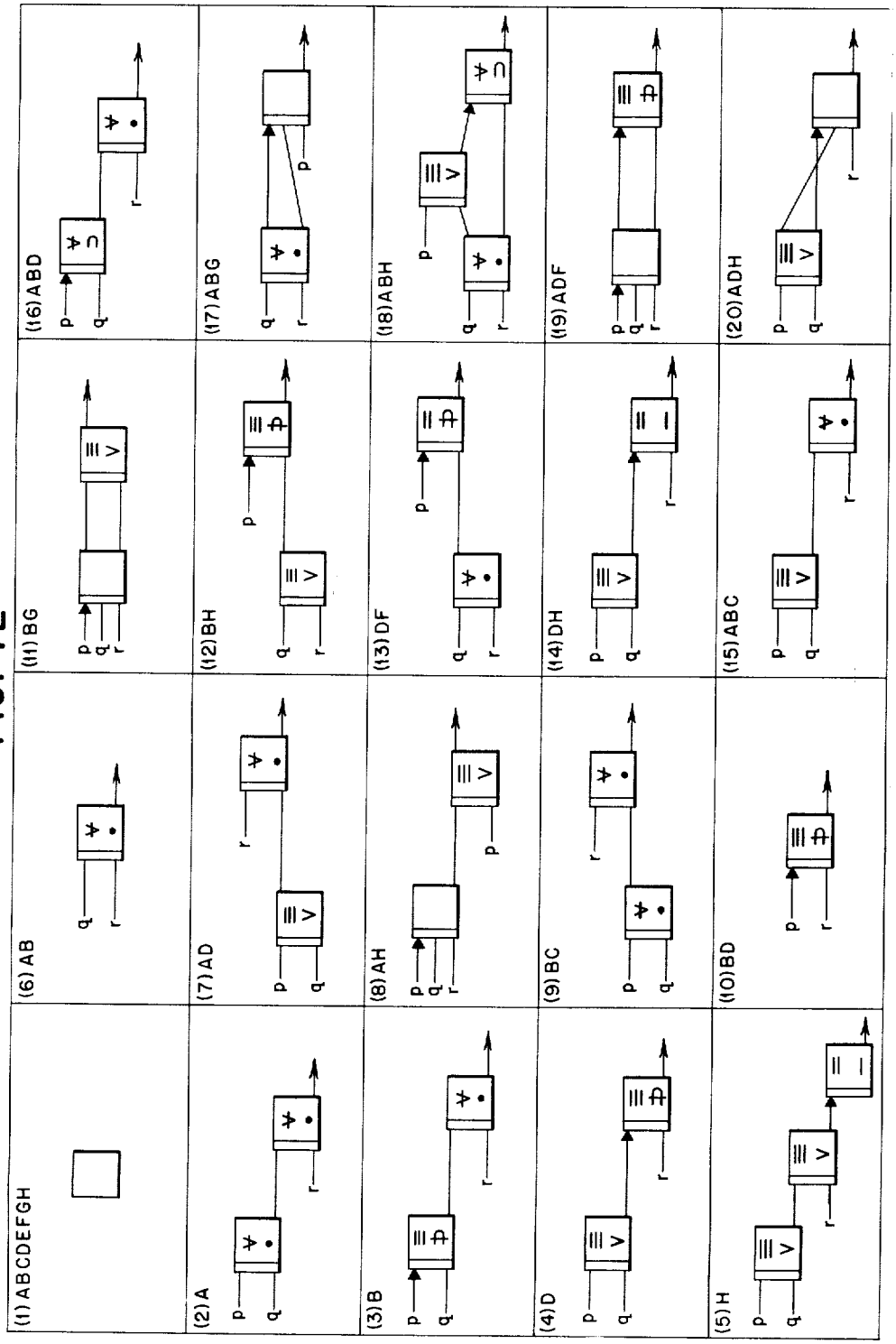
Figure 43:
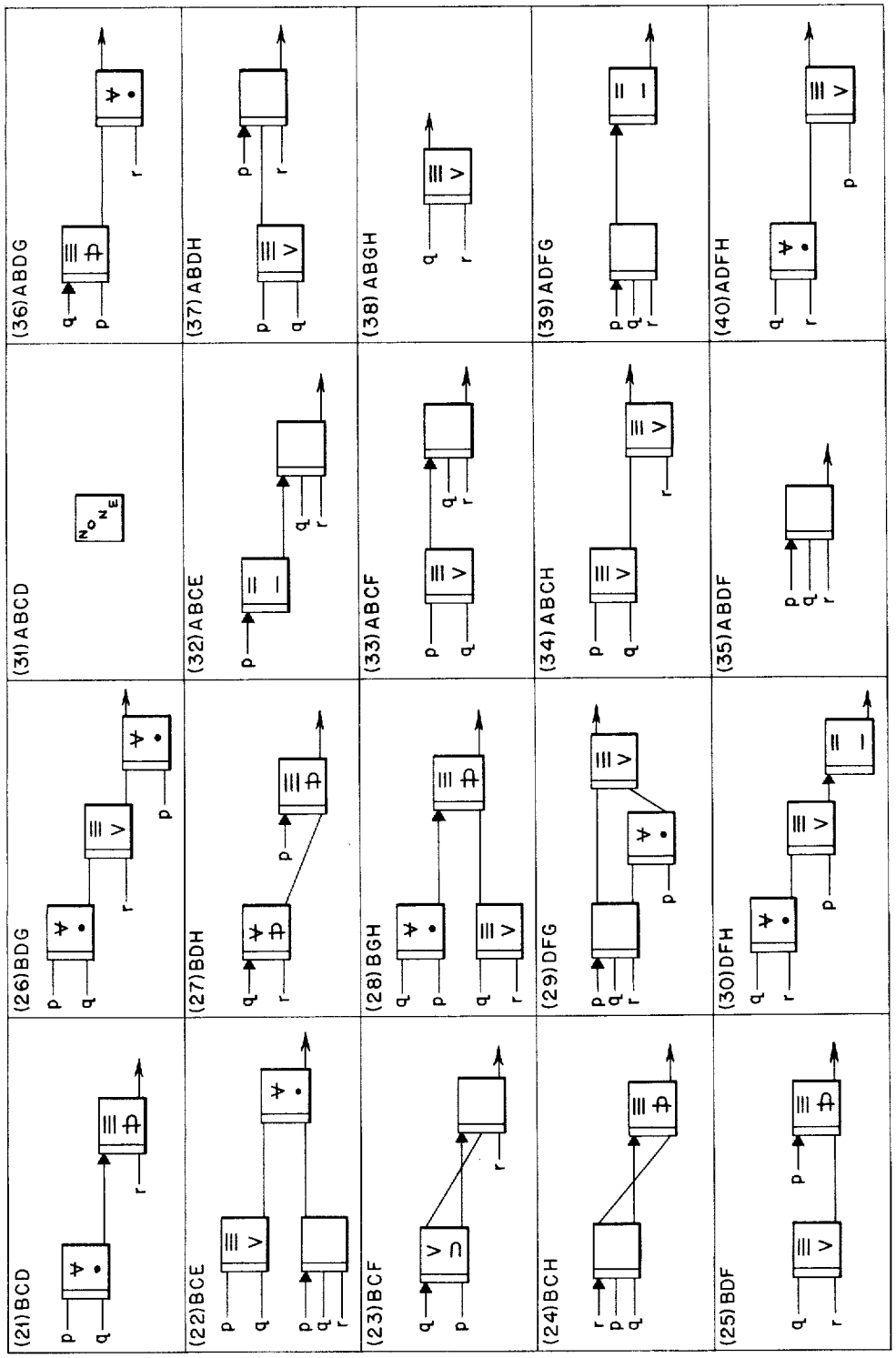
Figure 44:
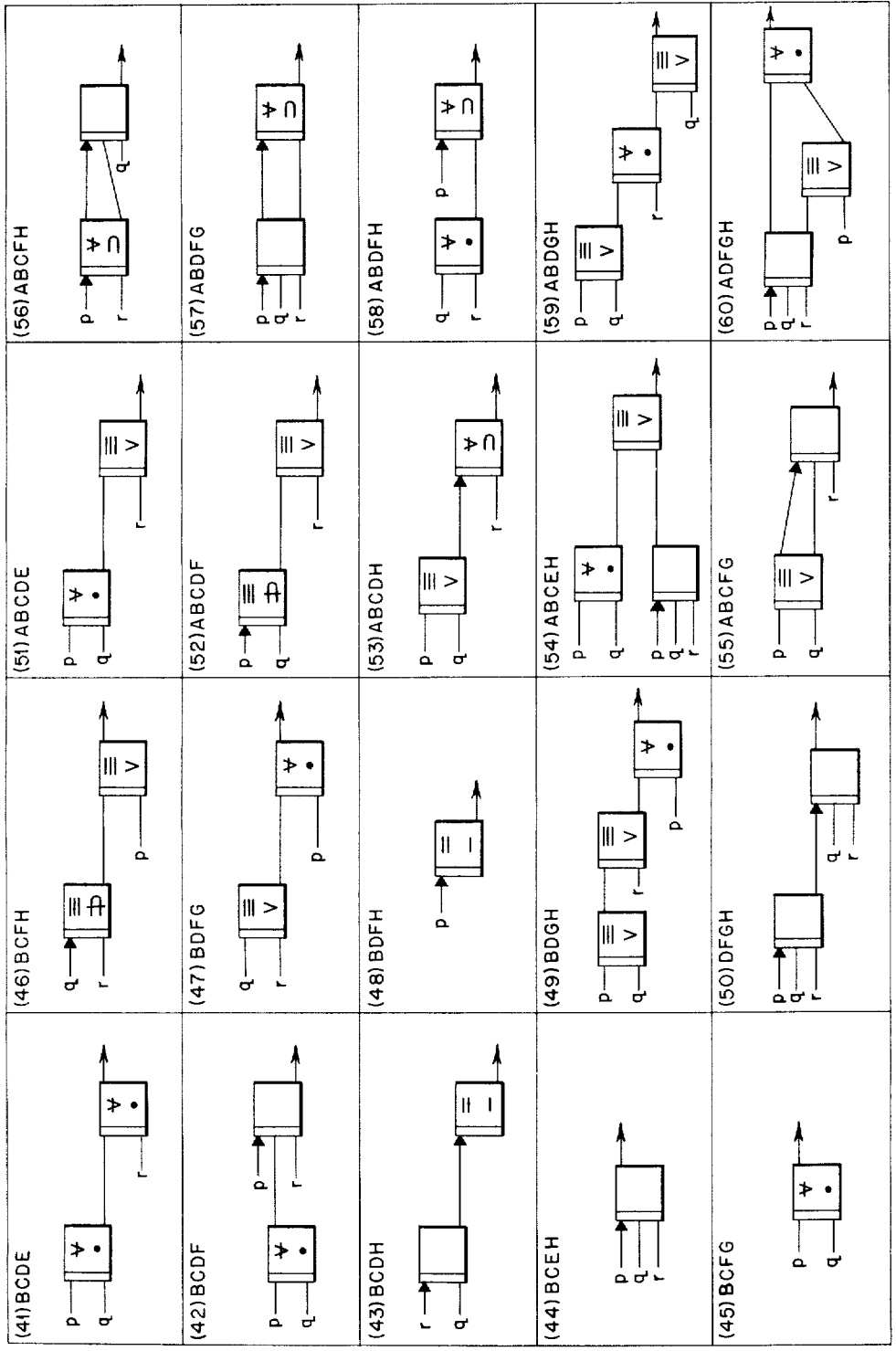
Figure 45:
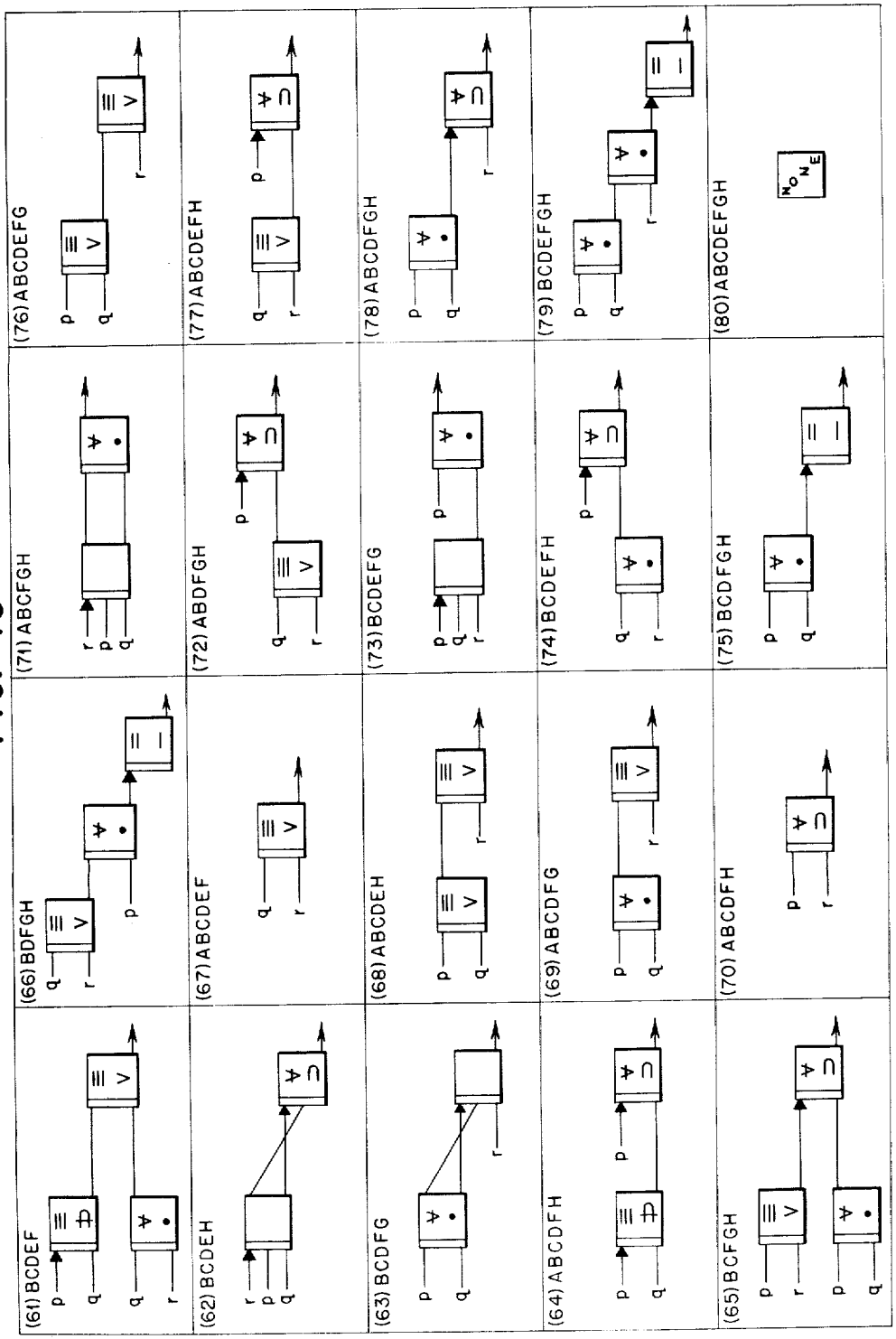

FIGURE 41 is a complete circuit diagram of a physical embodiment of the expression in FIGURE 39.

FIGURES 42, 43, 44 and 45 show a table wherein the 80 interchange operators are achieved through the use of noncommutative devices.

Figure 46:
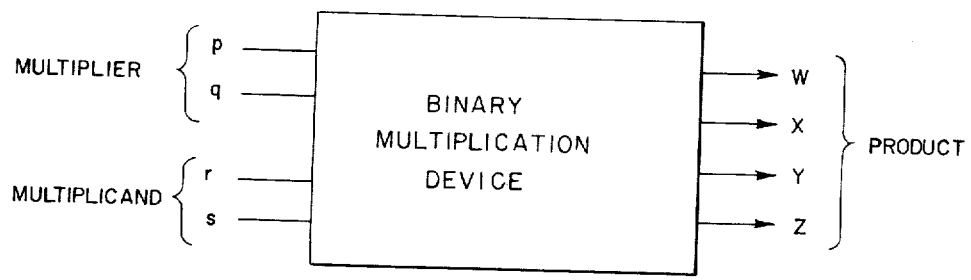

FIGURE 46 is an expression showing a logical notation of a binary multiplication device.

In order to present a picture of the logical considerations involved in the processing of information and the relationships of these considerations to information handling machine design, the following discussion is presented concerning input information systems and the elements that each higher order system has in common with lesser order systems. This discussion will cover in detail the binary or two input variable information system and ternary or three input variable information system, the relationships between the two systems and some physical embodiments of machine elements based thereon. Through the illustration presented by a comparison of these two systems one skilled in the art will be able to apply the principles taught by this invention to the fabrication of logical elements for handling information of systems of higher orders than can be illustrated. While it is an established principle that any logical relationship between a group of variables of one order can be expressed by a series of comparisons of the variables in groups of a lesser order, it is of great advantage to be able to achieve the logical relationship directly or as directly as is possible within the limits of the physical embodiment being used in the machine to perform the logical comparison. What is to be shown by this invention is a philosophy of device application and machine design whereby the greatest advantage of the ability of the device to perform the desired logical comparison will be realized and a method will be shown whereby the most versatile and effective logical device may be determined to perform a logical comparison for an input system of a particular order.

Considering first the binary information system, namely a system wherein there are but two variables, there are sixteen logical operators. These are tabulated in FIGURE 1. These logical operators describe the relationship between the presented information and the resulting information and may be divided into three classes namely nullary, singulary and binary. Any logical expression having two variables, however long, will be truth functionally equivalent to one of the sixteen operators of FIGURE 1.

The nullary or constancy logical operator is one through which the same information results regardless of what was presented.

The singulary logical operator is one through which the resulting information is a result of only one variable from that which was presented.

The binary logical operator is one through which the resulting information is the result of two variables. There are 16 binary logical relationships but as may be seen from FIGURE 1 and subsequent discussion, a number of these are also nullary, singulary or may be permuted into other expressions so that there are only eight binary operators that cannot be further reduced. These operators are as follows:

(a) AND, which is symbolized ●, indicates the presence of both variables simultaneously.

(b) OR, symbolized $\vee$ which indicates the presence of at least one of the variables.

(c) EXCLUSIVE OR, symbolized $\vee\!\!\!/$ indicates the presence of one but not both of the variables.

(d) IF AND ONLY IF, symbolized ≡, indicates either the presence or the absence of both variables.

(e) NEITHER NOR, symbolized ↓, indicates the absence of both variables.

(f) NOT BOTH, symbolized |, indicates the presence of both variables by delivering no resulting signal when both are present. This operator is sometimes referred to as the Sheffer stroke.

(g) NOT IF THEN, symbolized $\not\supset$ indicates the presence of one particular variable and the absence of the other. It will be noted that NOT IF THEN may appear in two forms, namely the first dependent upon the second and the second dependent upon the first.

(h) IF THEN, symbolized ⊃, indicates the converse of NOT IF THEN namely the absence of an output dependent upon the presence of one variable and the absence of the other. This operator also may appear in two forms.

These binary operators are known as full binary operators. The entire logic system, that is, the system involving two variables, is presented in FIG. 1, which is a truth table of two variables labeled 'p' and 'q' with the resulting information assigned a "1" to indicate presence and "0" to indicate absence.

Figure 1:
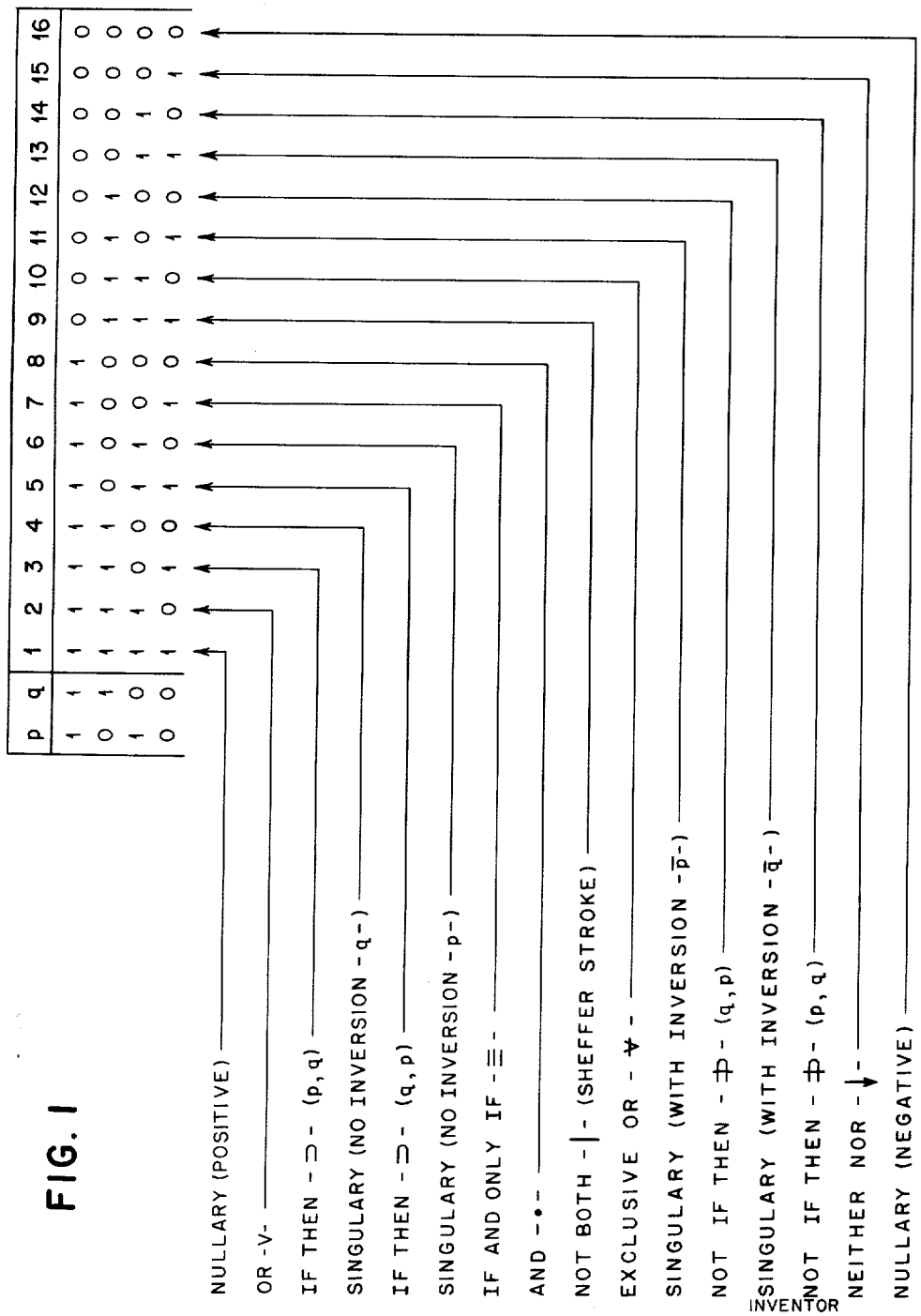
FIGURE 1 is a table showing the system of binary logical functions.

Referring now to FIGURE 1, in column 1 all resulting signals are "1" regardless of the input variables 'p' and 'q.' Column 1 then represents the positive nullary function.

Considering next column 2, here the resulting signal is "1" if 'p' or 'q' or both 'p' and 'q' are assigned "1." Thus column 2 illustrates the full binary operator OR – $\vee$ –.

In columns 3 and 5 the full binary operator IF THEN – ⊃ – is described. In column 3, the resulting signal is "0" if and only if "1" is assigned to 'p' and "0" is assigned to 'q.' Similarly, in column 5 the resulting signal is "0" if and only if "0" is assigned to 'p' and "1" is assigned to 'q.' The full binary operator IF THEN and its counterpart NOT IF THEN, to be explained below, have one property not common to all other full binary operators. This property is the fact that the resulting signal is a function not only of the number of input variables, but also of which one of the input variables receives a specific assignment. These operators, then, are known as noncommutative operators, and may be contrasted with all other full binary operators in that the other, commutative, full binary operators, ●, $\vee$, $\vee\!\!\!/$, ≡, ↓ and | produce resulting signals dependent only upon the number of input variables present and not upon a particular assignment to a specific one.

Column 4 duplicates the assignment given to the input variable 'q' and hence describes a function of a singulary operator wherein the same resulting signal is received.

Similarly, column 6 duplicates the assignment given to one input variable, 'p,' in this case, and hence describe a function of a singulary operator wherein the same resulting signal is received. Columns 4 and 6, just described, are known as functions of a positive singulary operator and columns 11 and 14 to be described later are related in that they are functions of a negative singulary operator.

Column 7 indicates a resulting signal if and only if both 'p' and 'q' receive like assignments of "1" or "0." This column then is the function of the full binary operator IF AND ONLY IF – ≡ –.

Column 8 indicates a resulting signal only where both input variables 'p' and 'q' receive like assignments of "1." Thus this column is a function of the full binary operator AND – • –.

Column 9 is a function of the full binary operator NOT BOTH – | –, frequently referred to as the "Sheffer stroke." In this column a "0" results only when both 'p' and 'q' input variables receive like assignments of "1."

In column 10 a "1" is observed in those cases where either 'p' or 'q' is assigned "1" but not both 'p' and 'q.' This is the function of the full binary operator EXCLUSIVE OR – ∀ –.

Columns 11 and 13 are the converse of columns 6 and 4 respectively, as described above, they are the function of a singulary operator with inversion, commonly referred to as NOT – — –.

In columns 12 and 14 as mentioned above the inverse of IF THEN – ⊃ – of columns 3 and 5 respectively appear. In column 12 a resulting signal "1" occurs if and only if "0" is assigned to 'p' and "1" is assigned to 'q.' Similarly, in column 14, a resulting signal "1" occurs if and only if "1" is assigned to 'p' and "0" is assigned to 'q.' These columns then described the functions of the noncommutative full binary operator NOT IF THEN – ⊅ –.

Column 15 indicates the function of the full binary operator NEITHER NOR – | –. In this column a "1" results only when neither 'p' nor 'q' is assigned "1."

Column 16 describes the function of the negative nullary operator since the result is "0" and is completely independent of the assignments given to 'p' and 'q.'

From the description thus far it may be noted that in truth functional relationships all may be considered to be the function of the input information and a certain logical operator. Thus far there have been shown to be 2 nullary operators, $2^2$ singulary operators and $2^4$ binary operators, of which number, only eight represent full binary operators whose functions are not permutable or reducible to the result of singulary or nullary operators.

Of the binary logical operators shown in FIGURE 1, each individual operator may be achieved directly through the use of one of a number of circuits that are standard in the art, for example, AND, OR, EXCLUSIVE OR, GATING and INHIBIT circuits and combinations thereof. Through the use of these, any binary logical relationship can be achieved but this is done at the expense of frequently providing several logical steps to perform a given logical relationship and when the power and components directly and indirectly involved to operate these circuits are considered, the system becomes very large to perform a single logical relationship.

The binary logical functions in the table of FIGURE 1, may all be expressed by the combination of the singulary function NOT — and one of the full binary functions, for example AND – • – or OR – V –. It may be seen by inspection that the last eight columns of FIGURE 1 are the denial of the first eight in inverse order. In other words, column 9 is the denial of column 8; column 10 the denial of column 7, etc. Further considering the table below, the columns 1 to 8 of FIGURE 1 are expressed as functions involving the functions • and —. The symbol – over a variable designates denial of the variable whereas the symbol "—" designates denial of the expression following it.

| 'p' 'q' | 1 | 2 | 3 | 4 | 5 | 6 | 7 | 8 |
|---|---|---|---|---|---|---|---|---|
| 1 1 | 1 | 1 | 1 | 1 | 1 | 1 | 1 | 1 |
| 0 1 | 1 | 1 | 1 | 1 | 0 | 0 | 0 | 0 |
| 1 0 | 1 | 1 | 0 | 0 | 1 | 1 | 0 | 0 |
| 0 0 | 1 | 0 | 1 | 0 | 1 | 0 | 1 | 0 |

—(p·p̄)
—(p̄·q)
—(p·q̄)
q
—(p̄·q)
p
—(p·q)·—(p̄·q)
p·q

From the above eight expressions and the fact that the denial of these expressions will achieve the remaining eight binary functions, it may be seen that all sixteen binary expressions may be achieved through the use of NOT and AND. A similar set of such permutations as shown above are possible to show that all functions are expressible in terms of — and V.

Further, since the combination of — and • is truth functionally equivalent to the operator NOT BOTH – | –, then any binary logical operator may be expressed in terms of NOT BOTH – | –. Similarly, since the combination of — and V is truth functionally equivalent to ↓, then this connective also may be used to express any binary logical operator. However, the use of a single logical operator to express all others in a system may result in expressions which are very long. To clearly illustrate this, consider the following three truth functionally equivalent logical expressions involving two variables:

(1) $-(p \cdot \bar{q}) \cdot -(\bar{p} \cdot q)$ (2) $((p \downarrow p) \downarrow q) \downarrow (p \downarrow (q \downarrow q))$ (3) $p \equiv q$ It will be apparent that while being able to achieve a truth functional equivalent of a particular expression in terms of a single logical operator is of advantage in reducing the number of kinds of machine element necessary to solve the expression, the number of elements that are required may be very large. In Expression 2 five elements achieving the operator NEITHER NOR – ↓ – are required to solve Expression 1. In contrast, the truth functional solution of Expression 1 is the operator ≡ so that only one element achieving this operator is needed. Thus logical efficiency is acquired when it is possible to achieve directly a truth functional operator representing the solution of a given expression and logical versatility is acquired when a sufficient variety of operators are achievable directly so that the number of machine elements required for all logical relationships associated with a given input system is at a minimum. The value of this will become increasingly apparent when considering systems involving more than two variables, which will be described later.

It has been discovered that multi-input, multi-output, and in particular for the examples presented, three input, two output devices, provide very versatile logical elements that are capable by simple adjustment of performing the function of many of the binary logical operators, achieving each result directly and having, in many cases, two logical operators realized at the same time. These logical elements may be combined into logical devices wherein the full range of logical relationships for a given information system may be achieved directly and with a large reduction in circuit complexity.

Multipurpose elements have appeared in the art although not in so comprehensive an application as here described. For example, a multipurpose element is described in the pamphlet "Symbolic Logic, Binary Calculation and 3C–PACS" above cited which does not use the principle of constant function selection for the achieving of functions of a lesser order. In addition a device known in the art as a "Decision Element" is described in a memorandum from Minnesota Electronics above cited in which different functions are obtained by such principles as external adjustment of diode circuitry, but not in the manner herein described.

The elements herein described in each case achieve their multipurposeness directly through the use of biasing of inputs of commutative functions and through the combination of the use of biasing and of appropriate selection of inputs for introduction of variables or biases for noncommutative functions. The concept of biasing and the element of noncommutativity will be explained in detail later.

A first of these logical elements is a three input, two output device performing such that the first output, delivers a signal and is considered ON when exactly one or three of the inputs receive signals and is otherwise OFF and such that the second output is ON when exactly two or three of the inputs are ON and is otherwise OFF. Thus this device generates two "full ternary" logical operators and these operators will be described in detail later in connection with the ternary input system. The binary addition element known as a "full adder" will satisfy these conditions. The logical advantages of the full adder can best be understood by considering the following table showing the logical relationship of a full adder wherein standard binary addition terminology is applied to the inputs and output.

| Condition | $p$ | $q$ | Carry input $r$ | Sum  | Carry  |
|---|---|---|---|---|---|
|  | Variable | Variable | Logical function selection | $\equiv$ | V |
| A | 1 | 1 | 1 | 1 | 1 |
| B | 0 | 1 | 1 | 0 | 1 |
| C | 1 | 0 | 1 | 0 | 1 |
| D | 0 | 0 | 1 | 1 | 0 |
|  | Variable | Variable | Logical function selection | ⊻ | • |
| E | 1 | 1 | 0 | 0 | 1 |
| F | 0 | 1 | 0 | 1 | 0 |
| G | 1 | 0 | 0 | 1 | 0 |
| H | 0 | 0 | 0 | 0 | 0 |

From the above table it may be seen that if a constant function selection signal is assigned to one of the three input terminals, for example the '$r$' terminal, arbitrarily called the carry input terminal for purposes of illustration, then the conditions are as follows:

A. Where '$p$' is "1" and '$q$' is "1": Since '$r$' is already assigned "1" and the adder sees three input signals and both

, sum and

carry are "1."

B. Where '$q$' is "1" and '$p$' is "0": Here the adder sees only the signals from '$q$' and '$r$,' two in total and the

only is "1," whereas the sum

is "0."

C. Where '$p$' is "1" and '$q$' is "0": This is the numerical equivalent to condition B so far as the adder is concerned and the resulting signal "1" will appear at the carry

with no signal "0" appearing at the sum.

D. Where '$p$' is "0" and '$q$' is "0": Here the adder sees only one signal, namely the function selection signal on the carry input '$r$' and hence the sum

is "1" and the carry

is "0."

Under these conditions the sum

output describes the function of the logical operator IF AND ONLY IF symbolized ≡ and at the same time the carry

output describes the function of the logical operator OR symbolized – V –.

If the constant function selection signal is "0," conditions E, F, G and H are obtained.

E. Where '$p$' is "1" and '$q$' is "1": The adder sees two inputs causing the sum

to be "0" and the carry

to be "1."

F. Where '$p$' is "0" and '$q$' is "1": The adder sees only one input, hence the sum

is "1" and the carry

is "0."

G. Where '$p$' is "1" and '$q$' is "0": This is the numerical equivalent, as far as the adder is concerned, with condition F, hence the sum

is "1" and the carry

is "0."

H. Where '$p$' is "0" and '$q$' is "0": Here all inputs are "0." Hence both the sum and the carry are "0."

Under these conditions the sum

output describes the function of the logical operator EXCLUSIVE OR symbolized – ∀ –, and the carry

output describes the function of the logical operator AND symbolized – • –.

In addition to these logical operators, as may be seen from the above table, if unlike assignments are given to both the logical function selection terminal and one of the variable terminals, the results are as follows considering conditions C, D, E and F.

C and D: Here '*q*' is "0" and '*r*' is "1" in both cases and the sum

indicates "0" when '*p*' is "1" and "1" when '*p*' is "0." At the same time carry

indicates "1" when '*p*' is present and "0" when '*p*' is absent.

E and F: Here '*q*' is "1" and '*r*' is "0" in both cases and the sum

and carry

are identical with conditions C and D.

The adder, being a commutative device, namely, that the output depends only upon the number of inputs receiving signals and not which input receives a signal, therefore it will perform the same for '*q*' as the variable '*p*' and '*r*' receiving fixed unlike assignments.

Under the above conditions, the sum

output describes the function of the singulary operators with inversion, – NOT – symbolized – and at the same time the carry

output describes the function of the singulary operators without inversion. These operators are described in FIGURE 1 in columns 11, 13, 4 and 6 respectively.

Thus it may be seen that the use of a full adder with function selection signals enables the realization of the functions of the full binary operators

•, V, ∀, and ≡ and in addition all four of the singulary operators '*p*' and '$\bar{p}$,' '*q*' and '$\bar{q}$.'

There are many examples of "full adders" known in the art in the mechanical, electromechanical and electronic fields. A mechanical device wherein mechanical motion is imparted to one output shaft as a result of one or three increments of motion being applied to an input shaft and being otherwise stationary and wherein mechanical motion is imparted to a second output shaft when either two or three increments of motion are applied to the input shaft and is otherwise stationary, will perform the function of a full adder from a logical standpoint.

Figure 2:
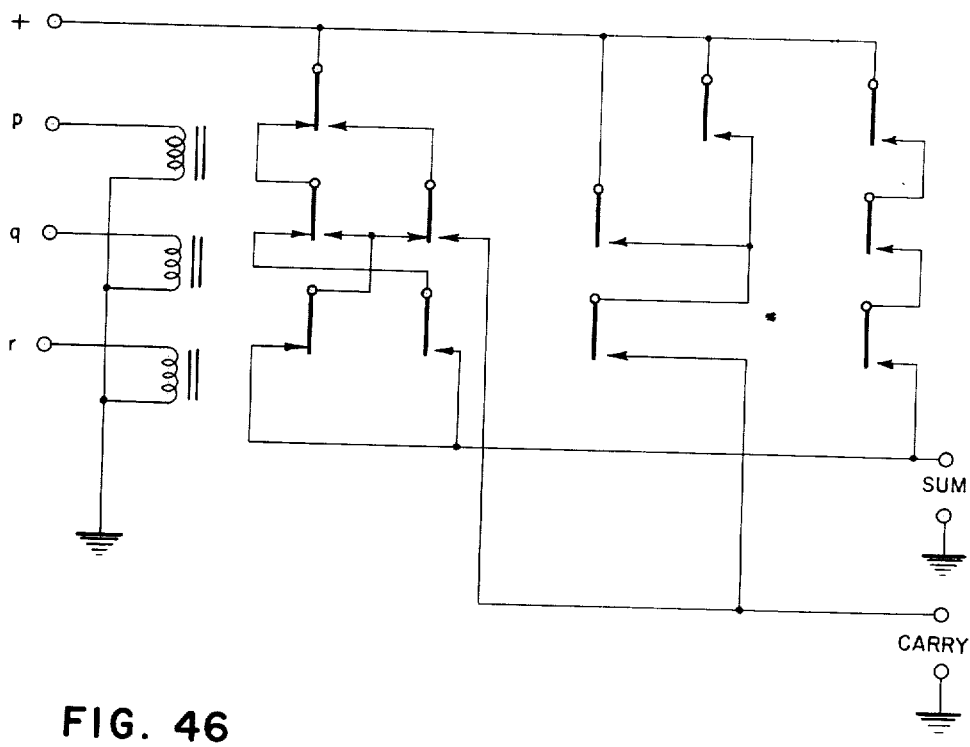
FIGURE 2 is an electromechanical embodiment of a three input, two output logical element.

An example of an electromechanical full adder is shown in FIGURE 2. Here each of three inputs '*p*,' '*q*' and '*r*' energizes a relay and from a positive potential, selected circuits are completed through the points of the relays to provide a sum output only when one or three of the relays are energized and a carry output only when two or three of the relays are energized.

In the electronic field several examples of circuits performing full binary addition are available. A discussion of these devices appears in the following references:

Arithmetic Operations in Digital Computers, by R. K. Richards, chapter 4, pages 81–135, and High Speed Computing Devices, by Engineering Research Associates, Inc., chapter 13, pages 265–301.

Two types of full adder suitable for purposes of this invention are described in a copending application, Serial Number 644,509, of John W. Horton and Arthur G. Anderson entitled "Binary Full Adders," filed March 7, 1957, and assigned to the assignee of this application. One of these full adders uses vacuum tubes and the other employs a solid state device known in the art as a positive gap diode. Other solid state full adders may be made up of half adders and other logical elements such as those discussed in a thesis by M. K. Haynes entitled "Magnetic Cores as Elements of Digital Computing Systems," January 2, 1951, University of Illinois.

Still another of these versatile logical elements is the Multiple Collector Transistor of R. F. Rutz, described in copending application, Serial Number 645,627, filed March 12, 1957, and assigned to the assignee of this application. The principle of operation of this device is explained in detail in the above referred to application.

From a logical information handling standpoint the multiple collector transistor has four modes of operation, the first of which is that of a three input, two output device performing as described in the above definition of a full adder. The second mode of operation provides a logical device having three inputs and one output wherein the sum output

is ON only when one of the three inputs is assigned "1" and is otherwise OFF. The third mode of operation provides a three input one output device wherein the sum output

is assigned "1" when one or two of the inputs are assigned "1" and is otherwise "0." The fourth mode of operation provides a logical device wherein the first output

is assigned "1" when one or more than one of the inputs is assigned "1" and is otherwise "0" and where the second output is assigned "1" only where two of the inputs are assigned "1" and is otherwise "0."

The above described modes of operation of this device provide the following logical functions. In mode 1 the functions of the full adder described above obtain: in mode 2 with a logical function selection of a constant "1" the

describes the function NEITHER NOR symbolized – ↓ –; in mode 3 the

biased positively with a logical function selection of a constant "1," describes the function NOT BOTH – | –, and in mode 4 biased negatively with a logical function selection of a constant "0" the

describes V while the

describes — ● —. The above functions resulting from the four modes of operation may be seen in the truth tables below.

MODE 1

Full Adder

This truth table is the same as the truth table for the description of the full adder and all logical functions achieved are the same as described above.

MODE 2

| Variable | Variable | Logical function selection | ↓ NEITHER NOR |
|---|---|---|---|
| 1 | 1 | 1 | 0 |
| 1 | 0 | 1 | 0 |
| 0 | 1 | 1 | 0 |
| 0 | 0 | 1 | 1 |

MODE 3

| Variable | Variable | Logical function selection | ↓ NOT BOTH |
|---|---|---|---|
| 1 | 1 | 1 | 0 |
| 1 | 0 | 1 | 1 |
| 0 | 1 | 1 | 1 |
| 0 | 0 | 1 | 1 |

MODE 4

| Variable | Variable | Logical function selection | V OR | ● AND |
|---|---|---|---|---|
| 1 | 1 | 0 | 1 | 1 |
| 0 | 1 | 0 | 1 | 0 |
| 1 | 0 | 0 | 1 | 0 |
| 0 | 0 | 0 | 0 | 0 |

This device is switched from one mode of operation to another by internal adjustment as described in the above referred to copending application, Serial No. 645,627.

Thus this multiple collector transistor is capable of achieving directly all of the binary commutative operator functions, namely, ●, V, ∀, ≡, ↓ and | and hence this device from a logical standpoint is an "absolute binary commutator."

Through the use of three input, two output devices considerable advantage is gained in being able to generate directly the full binary operators ∀, ≡, ↓ and |

In the case of

∀ and ≡ these two operators can in many cases be substituted into an already minimized expression, assembled logically from ●, V and — in such a way as to reduce the number of full binary operators required. In fact ∀ and ≡ are the only two of the possible binary operators that can be so used. An illustrative example of such a substitution can be seen by considering the fact that the expression $$-(p \cdot q) \cdot (p \vee q)$$

is the equivalent of the simpler expression $$p \forall q$$

In examining the expressions in detail the following truth functional tables result.

| — | (p | ● | q) | ● | (p | V | q) | = | p | ∀ | q |
|---|---|---|---|---|---|---|---|---|---|---|---|
| 0 | 1 | 1 | 1 | 0 | 1 | 1 | 1 | | 1 | 0 | 1 |
| 1 | 0 | 0 | 1 | 1 | 0 | 1 | 1 | | 0 | 1 | 1 |
| 1 | 1 | 0 | 0 | 1 | 1 | 1 | 0 | | 1 | 1 | 0 |
| 1 | 0 | 0 | 0 | 0 | 0 | 0 | 0 | | 0 | 0 | 0 |
| (1) | (2) | (3) | (4) | (5) | (6) | (7) | (8) | | (9) | (10) | (11) |

In the above tables columns (2), (4), (6), (8), (9) and (11) indicate the variables 'p' and 'q' themselves. Column (3) describes the binary operator ● for the expression (p·q), column (1) describes — for the expression (p·q) and is the negative of column (3). In the expression $$(p \vee q)$$

column 7 describes the binary operator V. Since the entire expression is the result of the binary operator ● operating on the expression — (p·q) and $$(p \vee q)$$

then column (5) will represent ● with columns (1) and (7) the variables. Observation will show that column (5) is the same as column (10) and therefore $$-(p \cdot q) \cdot (p \vee q)$$

is equivalent to $$p \forall q$$

The advantage of the use of such multi-input, multi-output devices may be most sharply observed when the ternary information system is considered. Here, the addition of one variable results in $2^3$ possible input combinations and $2^8$ possible logical functions of these combinations. The ternary logical truth table is shown in FIGURES 3 through 12. In the ternary system special symbols, such as |, V, etc. as used in the binary system, have not been given to the particular ternary operator because of the number of operators, and instead, a labelling system has been adopted wherein each of the eight possible input combinations of 'p,' 'q,' 'r' have been given a letter designation A, B, C, D, E, F, G or H and each operator is designated by a group of these letters indicating the input combinations at which a positive output is received.

As in the binary system described above, a number of the two hundred fifty-six logical operators in the ternary system involve functions of purely nullary, singulary and binary operators. There are two nullary, six singulary, thirty binary and two hundred eighteen full ternary operators in this system. In addition there are a number of interchange equivalents among the operators that permit reduction of the number. An operator is an interchange equivalent of another operator when either the first operator is truth functionally equivalent to the second operator or there is a logical expression that is truth functionally equivalent to one operator that a second operator can describe by mere permutation of schematic letters. In the case of operators admitting of a reduction to a smaller number of variables, the redundant variables may be considered as vacuously present.

Further, from the schematic variable notations 'p,' 'q,' and 'r,' an infinite number of truth functional formulas can be assembled, however, this multitude can be broken down into two hundred fifty-six nonoverlapping groups, each representing a truth functional equivalent of one of the ternary operators described in FIGURES 3 through 12. An illustration of this may be seen in the following truth table:

|   | $p$ | $\forall$ | $(r$ | $\lor$ | $(p$ | $\cdot$ | $q))$ |
|---|---|---|---|---|---|---|---|
| A | 1 | 0 | 1 | 1 | 1 | 1 | 1 |
| B | 0 | 1 | 1 | 1 | 0 | 0 | 1 |
| C | 1 | 0 | 1 | 1 | 1 | 0 | 0 |
| D | 0 | 1 | 1 | 1 | 0 | 0 | 0 |
| E | 1 | 0 | 0 | 1 | 1 | 1 | 1 |
| F | 0 | 0 | 0 | 0 | 0 | 0 | 1 |
| G | 1 | 1 | 0 | 0 | 1 | 0 | 0 |
| H | 0 | 0 | 0 | 0 | 0 | 0 | 0 |
|   | (1) | (2) | (3) | (4) | (5) | (6) | (7) |

Here columns (1), (3), (5) and (7) represent the variables with '$p$' appearing more than once. Column (6) represents the expression $p \cdot q$, column (4) represents the expression $$r \lor (p \cdot q)$$

and column (2) represents the entire expression $$p \forall (r \lor (p \cdot q))$$

In column (2) a positive output appears only under input conditions B, D and G, thus the entire expression is the equivalent of the ternary operator BDG in FIGURE 10.

In examining expressions it has been found that an appropriate interchange of $\forall$ and $\equiv$ will also enable many denial signs to be removed. Any expression or part of an expression in which $\forall$ and $\equiv$ are the only nonsingulary operators found is equivalent to an expression of equal length from which — has been eliminated. For example:

$$(p \forall \bar{q}) \equiv r$$

is equivalent to $(p \equiv q) \equiv r$

|   | $(p$ | $\forall$ | $\bar{q})$ | $\equiv$ | $r$ | $=$ | $(p$ | $\equiv$ | $q)$ | $\equiv$ | $r$ |
|---|---|---|---|---|---|---|---|---|---|---|---|
| A | 1 | 1 | 0 | 1 | 1 |   | 1 | 1 | 1 | 1 | 1 |
| B | 0 | 0 | 0 | 0 | 1 |   | 0 | 0 | 1 | 0 | 1 |
| C | 1 | 0 | 1 | 0 | 1 |   | 1 | 0 | 0 | 0 | 1 |
| D | 0 | 1 | 1 | 1 | 1 |   | 0 | 1 | 0 | 1 | 1 |
| E | 1 | 1 | 0 | 0 | 0 |   | 1 | 1 | 1 | 0 | 0 |
| F | 0 | 0 | 0 | 1 | 0 |   | 0 | 0 | 1 | 1 | 0 |
| G | 1 | 0 | 1 | 1 | 0 |   | 1 | 0 | 0 | 1 | 0 |
| H | 0 | 1 | 1 | 0 | 0 |   | 0 | 1 | 0 | 0 | 0 |
|   | (1) | (2) | (3) | (4) | (5) |   | (6) | (7) | (8) | (9) | (10) |

In the above table columns (1), (3), (5), (6), (8) and (10) represent the variables, column (2) represents the expression $$(p \forall \bar{q})$$

column (7) represents the expression $(p \equiv q)$ and columns (9) and (4) represent the expressions $(p \equiv q) \equiv r$ and $$(p \forall \bar{q}) \equiv r$$

respectively and are identical. Further, both of these expressions are equivalent to the ternary operator ADFG in FIGURE 7.

Similarly, the addition of $\downarrow$ or $|$ will not further reduce the number of full binary operators in an already minimized expression but $\downarrow$ and $|$ like $\forall$ and $\equiv$ will in many cases permit a reduction in the number of denial signs needed. The expression $$\bar{p} \cdot (q \lor r)$$

for example is equivalent to $p \downarrow (q \downarrow r)$.

|   | $\bar{p}$ | $\cdot$ | $(q$ | $\lor$ | $r)$ | $=$ | $p$ | $\downarrow$ | $(q$ | $\downarrow$ | $r)$ |
|---|---|---|---|---|---|---|---|---|---|---|---|
| A | 0 | 0 | 1 | 1 | 1 |   | 1 | 0 | 1 | 0 | 1 |
| B | 1 | 1 | 1 | 1 | 1 |   | 0 | 1 | 1 | 0 | 1 |
| C | 0 | 0 | 0 | 1 | 1 |   | 1 | 0 | 0 | 0 | 1 |
| D | 1 | 1 | 0 | 1 | 1 |   | 0 | 1 | 0 | 0 | 1 |
| E | 0 | 0 | 1 | 1 | 0 |   | 1 | 0 | 1 | 0 | 0 |
| F | 1 | 1 | 1 | 1 | 0 |   | 0 | 1 | 1 | 0 | 0 |
| G | 0 | 0 | 0 | 0 | 0 |   | 1 | 0 | 0 | 1 | 0 |
| H | 1 | 0 | 0 | 0 | 0 |   | 0 | 0 | 0 | 1 | 0 |
|   | (1) | (2) | (3) | (4) | (5) |   | (6) | (7) | (8) | (9) | (10) |

In this case columns (1), (3), (5), (6), (8) and (10) represent the variables, column (4) represents the expression $$(q \lor r)$$

column (3) represents the expression $$\bar{p} \cdot (q \lor r)$$

column (9) represents the expression $(q \downarrow r)$ and column (7) represents the expression $p \downarrow (q \downarrow r)$. Since columns (2) and (7) are equivalent, then the expressions are equivalent and it may also be noted that they are equivalent to the ternary operator BDF in FIGURE 9.

One immediately apparent practical aspect of such transformation as the above is that with the elimination of − an inverter is eliminated from conventional circuitry. Further advantages will be pointed out in subsequent discussion.

One major advantage achieved through the use of three input, two output devices as logical circuit elements is gained from the fact that the outputs

are full ternary operators and can each be used to reduce in size many expressions assembled exclusively from binary and singulary operators. To illustrate this point consider a three input, two output device operating in a manner such that

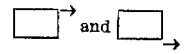

is ON and is assigned "1" when one or three inputs are assigned "1" and is otherwise OFF and

is ON and is assigned "1" when two or three inputs are assigned "1" and is otherwise OFF. These conditions describe a three input, two output device operating as a full binary adder with

being the sum and

being the carry. The carry

of a full adder describes a full ternary function that is equivalent to the expression $$(q \cdot r) \forall (p \cdot (q \forall r))$$

which is assembled from binary relationships. This may be seen from the truth table below.

| Variables | | | Full Adder | | | | | | | | | |
|---|---|---|---|---|---|---|---|---|---|---|---|---|
| p | q | r | □→ = | (q | · | r) | ∀ | (p | · | (q | ∀ | r)) |
| A... 1 | 1 | 1 | 1 | 1 | 1 | 1 | 1 | 0 | 1 | 0 | 1 | |
| B... 0 | 1 | 1 | 1 | 1 | 1 | 1 | 0 | 0 | 1 | 0 | 1 | |
| C... 1 | 0 | 1 | 1 | 0 | 0 | 1 | 1 | 1 | 1 | 0 | 1 | 1 |
| D... 0 | 0 | 1 | 0 | 0 | 0 | 1 | 0 | 0 | 0 | 0 | 1 | 1 |
| E... 1 | 1 | 0 | 1 | 1 | 0 | 0 | 1 | 1 | 1 | 1 | 1 | 0 |
| F... 0 | 1 | 0 | 0 | 1 | 0 | 0 | 0 | 0 | 0 | 1 | 1 | 0 |
| G... 1 | 0 | 0 | 0 | 0 | 0 | 0 | 0 | 1 | 0 | 0 | 0 | 0 |
| H... 0 | 0 | 0 | 0 | 0 | 0 | 0 | 0 | 0 | 0 | 0 | 0 | 0 |
| (1) (2) (3) | | | (4) | (5) | (6) | (7) | (8) | (9) | (10) | (11) | (12) | (13) |

Here, columns (1), (2), (3), (5), (7), (9), (11) and (13) represent the variables '*p*,' '*q*' and '*r*,' column (12) represents the expression $$(q \vee r)$$

column (10) represents the expression $$p \cdot (q \vee r)$$

column (6) represents the expression $(q \cdot r)$, column (8) represents the entire expression $$(q \cdot r) \vee (p \cdot (x \vee r))$$

and column (4) which is equivalent to column (8) represents

□→ which in this case is the carry of a full adder. The ternary operator represented is ABCE in FIGURE 4. The ternary operator represented by the sum of a full adder is ADFG in FIGURE 7.

In the above paragraphs a number of logical transformations have been shown to illustrate the fact that of the infinite number of possible logical expressions that are dependent upon three variables, these expressions may be reduced to an equivalent one of the two hundred fifty-six possible ternary operators. It has also been discovered that through the use of the full binary operators,

·, V, ∀, ≡, ↓ and | and the full ternary operators

□→ and □→ which can be achieved directly with three input two output logical devices, it is possible to classify any ternary logical expression into an interchange group of related expressions.

For example, the expression $\bar{p} \cdot (q \cdot r)$ may be shown to be truth functionally equivalent to the expression $p \downarrow (q|r)$ by truth table analysis as has been illustrated for several equivalent expressions discussed above. From the expression $p \downarrow (q|r)$ by permutation of the schematic letters '*p*' and '*q*' the expression $q \downarrow (p|r)$ may be achieved, and since from a machine standpoint, the assignment of a schematic letter to a particular input in such cases as this is arbitrary, these two expressions, while not logically equivalent, are interchange or machine equivalent.

Every interchange group has as members, one, three or six of the two hundred fifty-six possible logical operators in the ternary system. Examination of any one of the members will serve for the total interchange group of which that one is a part since the results obtained can be adjusted by a straightforward permutation of schematic letters to the other members involved.

The two hundred fifty-six possible ternary logical operators, may, by virtue of this discovery, then be reduced to eighty interchange equivalent operators. Each operator in a group is related to the remaining members of the group by the fact that all members may be realized from a single operator by mere permutation of the variable designation schematic letters '*p*,' '*q*,' and '*r*.'

In the eighty interchange groups, as has been noted in both the binary and ternary systems, there are functions of lesser order. There are two nullary, two singulary, eight binary and sixty-eight ternary operators among the eighty interchange groups. Thus it may be seen that a single logical element capable of achieving all of the eighty interchange equivalent operators will possess simultaneously, the qualities of maximum logical efficiency and versatility.

Referring now to FIGURES 13, 14, 15, and 16, the above discussion is illustrated in tabular form showing the eighty interchange groups. The table in FIGURES 13 through 16 is divided into columns A through H (not to be confused with the labels of the basic groups). In column A, labelled Guide Basic Group, each of the eighty listed operators is the one of the members of an interchange group having the earliest alphabetical label; the remaining members of the group are shown in column F. The entire interchange group is designated by the label of the earliest alphabetical member. Thus, for example, considering the Guide Basic Group number 16 in column A, this interchange group is labelled ABD and is composed of members ABD, ABF, ACD, ACG, AEF and AEG. Each of these members is one of the two hundred fifty-six logical operators of the ternary system as shown in FIGURES 3 through 12 with ABD appearing in FIGURE 5, ABF appearing in FIGURE 5, ACD appearing in FIGURE 6, ACG appearing in FIGURE 6, AEF appearing in FIGURE 7 and AEG also appearing in FIGURE 7.

In column B, labelled "First Simplification" the group is expressed in one example of a truth function equivalent expression using the binary operators −, ·, V, ∀, and ≡

The expression shown in this column is one of many truth functionally equivalent expressions for the particular interchange group it represents.

Column C represents a further simplification of the expression of column B wherein the full binary operator ↓ is employed. This operator permits simplification in fifteen of the eighty cases.

Column D illustrates a simplification of the expressions of column B wherein the full binary operator | is employed. The use of | was found to be of advantage in eleven of the eighty cases.

In column E, a still further simplification is illustrated in many cases through the use of full ternary operators. For illustration, the full ternary operators ADFG and ABCE such as could be achieved from the sum and carry respectively, of a "full adder" three input, two output device are shown. It should be noted that the simplifications shown as a result of the use of these particular full ternary operators is merely indicative of the logical efficiency acquired when a full ternary operator is employed and that a logical device realizing any other of the two hundred eighteen full ternary operators will provide similar results. In this column, unless otherwise shown, '*p*,' '*q*' and '*r*' denote the three inputs whenever □→ or □→ is used. A modified notation such as

'*p·q*'—□→
'*p*'—
'*r*'— stipulates that '*p·q*,' '*p*' and '*r*,' are the inputs. The symbol

□→ merely signifies that both ADFG and ABCE are realized by using both the sum and carry of a given full adder and the notation

indicates the application of two devices, the sum and carry of the first, achieving respectively ADFG and ABCE serve as the two variable inputs to a second device which is adjusted by biasing to achieve the full binary operator ≡. In column E, simplification is gained in twenty-six of the eighty cases.

The number of devices requisite for the logic of the table shown in FIGURES 13 through 16 may easily be determined by counting the occurrences of the operators $$-, \cdot, \vee, \forall, \equiv, \downarrow, |,$$ [⃗], [⃗], and [⃗]

and the number of kinds of devices needed in each case may be determined by counting the number of operators that can be realized by a given device. The highest degree of logical efficiency and versatility in any particular case is realized when the maximum number of operators is realized with the minimum number and kind of devices.

The column G, labelled MCE records the smallest number of commutators determined for each of the eighty interchange groups. As described above, an absolute binary commutator is capable of achieving −, and all of the full binary commutative operators $$\cdot, \vee, \forall, \equiv, \downarrow \text{ and } |$$

The term commutator, as used to determine the information tabulated in this column, is a three input, two output device capable of realizing the two full ternary operators ADFG and ABCE, all of the full binary operators, $$\cdot, \vee, \forall, \equiv, \downarrow \text{ and } |$$

and the singulary operator −. The multiple collector transistor described above is an example of this type of commutator. It should be noted that the table made up of FIGURES 13 through 16 illustrates a method of achieving a particular operator by establishing a truth functional equivalent expression as in column B of the desired particular operator such as any one shown in column A, simplification may then be made by one skilled in the art applying the principles of truth functional logic to express the desired particular operator in terms of other operators that can be realized by any particular device and the minimum number of these devices necessary to achieve the desired particular operator may then be determined.

In the table appearing in FIGURES 13 through 16 the ternary or three input system, has been used to denote the number of types of variable input. It is often advantageous from a simplification standpoint to use the same variable input a number of times. For example, the expression $$(q \cdot p) \downarrow (q \vee r)$$

shows that the inputs designated 'q,' appear twice. Since inputs are also needed for a 'p' and 'r,' a physical embodiment of this expression would require four signal loads. Hence, a signal load is merely the use of a variable input. In column H, the number of signal loads necessary for the simplified expression involving the minimum number of devices, is shown for each guide basic group.

Considering the table in FIGURES 13 through 16, three commutators are required in only twenty-six of the eighty cases. The remaining fifty-four can be achieved with less than three. Only one kind of logical device has been assumed. It should be noted that no tacit inversion of signals has been presupposed since it is desired that every illustrated logical operation be self-evident.

In column H, there are thirty cases requiring more signal loads than the three representing the number of variables in the particular system under consideration. In machine application, it is often of advantage to be able, if desired, to avoid having to provide extra signal loads. The use of the logical versatility of the commutator selected as the logical device will permit avoiding these extra loads to various degrees depending on the magnitude of the quality in the particular commutator selected. In this connection, some new notation must be introduced. Consider the following inscriptions:

, , [⃗], [↓⃗], and [−⃗]

The symbol

describes a three input, two output commutator such as a full adder having a function selection or bias such that one output, for example the sum, achieves ≡, and the other output, for example the carry, as explained above in connection with a discussion of three input two output devices, achieves ∨. Similarly, in the symbol

the upper arrow achieves ∀ and the lower ●. In the case of the symbols

[|⃗] and [↓⃗]

the commutator is biased to achieve the operator indicated and since only one output is used, the superfluous arrow is not indicated. The symbol

delineates a commutator biased to achieve −, and as was explained above where for example 'p' is the sole variable 'p̄' is realized at the upper arrow and 'p' itself is realized at the lower arrow. In view of this notation, and referring now to FIGURE 17, a graphic expression is shown of a commutator arrangement such as a circuit using electronic full adders that can achieve the operator ABCF (Guide Basic Group No. 33 in FIGURE 14 and appearing in FIGURE 4), and in realizing this operator, no extra signal loads are required. In the graphic expression of FIGURE 17, it may be seen that $\bar{q} \equiv p$, 'r' and 'q' represent the three variable inputs of the commutator functioning as a full adder, denoted by

and the unused input terminals of the other devices receive fixed biasing signals in accordance with the above discussion so that the desired operator is achieved in each device. Looking at the expression of FIGURE 17 in another way, what has been accomplished by the additional devices, is to cause the commutator

which normally would achieve ABCE, as explained above, to now achieve ABCF. Another illustrative example of signal load reduction and of operator modification, may be seen in FIGURE 18. In this figure, a first three input two output commutator, for example a full adder or a multiple collector transistor, is biased to achieve simultaneously ⩔ and ⬤, with respect to two variables '*q*' and '*r*,' the

output of this device is used as one of two variables, the other being '*p*,' in a second three input, two output commutator capable of achieving ↓ such as a multiple collector transistor, and the

output of the second commutator and the

output of the first commutator provide the variables for a third commutator achieving ⩔. It is obvious that in a case of this nature an ordinary OR circuit could perform the function of the third commutator and that the ≡ output is redundant in this case but for reasons to be apparent later, it is of advantage to have each circuit or other physical embodiment made up of elements having the same logical versatility in order to achieve logical efficiency. In this expression, the operator ABH is obtained (Guide Basic Group No. 18 in FIGURE 13 and appearing in FIGURE 5) with no extra signal loads.

Referring now to FIGURES 19 and 20 a table is shown of examples of graphical expressions using only three signal loads capable of realizing each of the thirty interchange operators listed in column H of the table shown in FIGURES 13 through 16 requiring more than one signal load for each variable. In FIGURES 19 and 20 each expression has an identifying and cross referencing label, for example, (1–11–BG) wherein the first number is a serial number, the second number is the serial number of the particular Guide Basic Group this expression represents, and the letters indicate both the Guide Basic Group label and the particular ternary operator represented. Expressions (4–18–ABH) and (13–33–ABCF) have been discussed in connection with FIGURES 18 and 17 respectively. In each of these expressions, as in previously discussed expressions, physical embodiments of these example expressions may be made up using systems such as linkages of mechanical devices, arrangements of electromechanical devices, circuits of electronic or solid state devices, or any combination of these, so long as the devices making up the embodiment have the requisite logical capacity and the interconnecting members can transmit the logical particles generated.

It may be seen from this table that if no extra signal loads are desired, three commutators are still sufficient for all but five of the eighty interchange operators. These five, at the present state of investigation, appear to require four commutators. However, as may be seen from the scope of the material being handled in this invention, it may be possible, through an exhaustive investigation using the principles of truth functional conversion, to produce an equivalent expression for each of these that can be realized with less than four commutators. The five cases requiring four commutators, are marked with *, in FIGURES 19 and 20.

An additional aspect of this situation concerns the applicability of the material presented in the tables of FIGURES 13 through 16 and 19 and 20 to three input, two output physical embodiments realizing different ternary operators from the multiple collector transisor embodiment. It has been pointed out that the multiple collector transistor, although quite simple, is a logically more versatile device than the usual full adder in that it can be adjusted to achieve ↓ and |. Although the adjustment to achieve the latter is not by mere biasing of inputs every expression in FIGURES 13 through 16, 19 and 20, which does not contain ↓ or | can be accomplished along the lines already indicated through the use of any kind of full adder.

A direct examination of the tables in FIGURES 13 through 16, and 19 and 20, reveals that three full adders as such, are sufficient to handle seventy-eight of the eighty interchange operators. The two remaining operators BDH and BCDFH can be realized with four full adders. However, if either one of the connectives ↓ or | were added, the two operators in question could be achieved by three physical devices. This is illustrated in FIGURE 21, wherein one physical device achieves | which is used as one variable in a full adder device, the carry output of which is used as the variable input of a device achieving –. Through the use of the expression of FIGURE 21, the operator BDH is realized. In FIGURE 22, a similar expression is shown employing the operator | and achieving BCDFH.

It is possible to impart to a particular physical embodiment employing three input, two output devices, some unique logical properties through the use of feedback. In FIGURE 23, there is shown a logical expression involving feedback capable of oscillation. If a "0" is assigned to '*p*' and "1" to '*q*,' any physical counterpart of this expression would oscillate. Referring to FIGURE 23, a "0" is introduced to both unassigned terminals in order to cause both physical embodiments to achieve ⩔ and ⬤ simultaneously. Under these conditions, if a "1" is assigned to '*q*,' with a "0" at '*p*,' a "1" is transmitted through the intelligence linkage labelled A.

This "1" causes a change in state in the upper device so that a "1" is transmitted by the intelligence linkage labelled B to the lower device. The lower device, upon receiving a "1" in addition to the '*q*' signal, changes state, thereby transmitting a "0" in A. Thus an oscillatory situation is set up. A similar set of conditions leading to oscillation will exist if a "1" is assigned to '*p*' and "0" to '*q*.'

It will be apparent from the above example that many commutator feedback circuits will be of an oscillatory nature and through application of the teaching of this invention one skilled in the art will be able to establish and evaluate these circuits. Considering further the aspects of commutator feedback circuits, certain selected examples appear in FIGURES 24 through 33, each example being illustrative of a class of devices. In FIGURE 24, three commutators are shown each receiving function selection signals on the unlabelled terminals such that the upper commutator achieves ⩔ and ⬤ simultaneously, the center commutator achieves ≡ and ⩔ simultaneously, and the lower commutator achieves ↓. The commutators are connected with a ⬤ output of the upper device, serving as one input of the center device. The output of the center device serves as one input of the lower device and the ↓ output of the lower device serves as one input to the upper device. This feedback hookup is a logical oscillator only in the case where "1" is assigned to '*p*,' and "0" to '*q*' and "0" to '*r*,' and in all other cases a physical embodiment of this would not oscillated. Thus, this expression oscillates in only one condition of the eight in the truth table.

In FIGURE 25 an expression is shown wherein oscillation can take place in two conditions of the truth table. In this figure, the upper device receives a fixed signal on the unlabelled terminal such that the device will achieve ⩔ and ⬤ simultaneously, the ⬤ output of this device serving as one input of the lower device which functions as a full adder, the sum output of which is connected as an input to the upper device. Under these conditions if "1" is assigned to '*p*,' "1" to '*r*' and "0" to '*q*,' oscillation will take place or, if "1" is assigned to '*p*,' "1" to '*q*,' and "0" to '*r*,' oscillation will take place. In the remaining six input variational conditions, no oscillation will take place.

Referring now to FIGURE 26, a nonoscillatory feedback expression is shown wherein both the upper and lower physical devices realize V as the operator and the V output of the lower device serves as one input to the upper device. The unlabelled terminals receive logical function selection signals of "1." If either '$p$' or '$q$' is assigned "1," a "1" will be transmitted by both intelligence linkages A and B. This hookup is unique in the condition where a "1" or a "0" is assigned to both '$p$' and '$q$,' in that with full consistency both A and B can receive like assignments of "1" and "0," hence "1" will tend to perpetuate "1" and "0" to perpetuate "0." Under these circumstances, since the output → of each device depends in part upon the state of A and B, then this expression is logically ambiguous for the condition '$p$'="0" and '$q$'="0."

A physical embodiment of such a device, however, when equipped with a resetting means, for example in a circuit a power interruption switch, could be reset after a troublesome condition and therefore be given a definitive truth table representation. These ambiguous feedback types of expressions frequently may be of great value in permitting a realization of a particular operator that may require greater logical complexity to achieve otherwise.

In FIGURES 27, 28, 29 and 30, there are illustrated four typical ambiguous feedback types of expressions. Considering first FIGURE 27, a first commutator is provided with a fixed signal at an unlabelled terminal so that ≡ and V are achieved simultaneously. The V output serves as one input of a second commutator generating the two full ternary functions ADFG and ABCE, in other words, functioning as a full adder, and '$q$' and '$r$' are the other two inputs to the second commutator and together with '$p$,' the carry output of the second commutator serves as the remaining input of the first commutator. The ternary operator ACDEFH (Guide Basic Group 71 in FIGURE 16 and appearing in FIGURE 5) appears at → on the first commutator and the ternary operator ABDFG (Guide Basic Group No. 57 in FIGURE 15 and appearing in FIGURE 4) appears at → on the second commutator. In the case of the operator ABDFG it may be seen that this expression, if reset is employed, will achieve this operator with two commutators, whereas in FIGURE 15 three commutators are required.

In FIGURE 28, a similar hookup is shown. However, in this arrangement the first commutator achieves ∀ and ● simultaneously and the second commutator achieves the full ternary functions of the full adder. In this case, the operators BCDE and ABCFG are realized with ABCFG being of the most interest. Through a comparison with FIGURE 15, it may be seen that ABCFG is the label of Guide Basic Group No. 55, and that this expression with reset can achieve with two commutators, an operator formerly requiring three.

Referring now to FIGURES 29 and 30, logical expressions are shown which employ three commutators each in a feedback hookup. The logical operations taking place in both figures are identical and the corresponding logical devices each realize the same operators and are interconnected in the same way, yet the expression in FIGURE 29 realizes ADEFH, ABCFH and CDFG, whereas the expression in FIGURE 30 yields ABDGH, ACDEH and DEFG. The reason for this is that the operators realized here, are noncommutative as were ⊃ and ⊅ previously discussed under the binary system, and hence the order of introduction of the variables is of importance. The property of noncommutativity possessed by certain operators, takes on greater significance as the number of variables in a system increases and will be explained in detail later. The expressions of FIGURES 29 and 30 with reset, serve as illustrations of ways to achieve the starred operators with a reduction in commutators and they serve to illustrate how a degree of noncommutativity may be introduced into an expression made up of purely commutative devices through the interconnection of the devices in the expression.

Ambiguous feedback circuits without zero reset should not be disregarded however. Such hookups are indeterminate, but only insofar as their immediate condition is a function of more than the concurrent nonfeedback inputs. The prior logical state of the circuit is also relevant and as a result memory is involved. Consider, for example, that each of the eight feedback examples shown in FIGURES 23 through 30, were operated so that input signals follow one another chronologically. If a list of the temporally ordered signals correlative with the assignments of "1" or "0" to '$p$,' '$q$' and '$r$' were provided, a table could then be set up determining the progressive logical states of the hookup. Under these circumstances, it would be apparent that the property of memory would result in a signal in certain cases being trapped in a feedback line at one step, and being capable of influencing operation at a later step.

An analogous example of feedback may be seen in FIGURE 31 wherein a commutator is shown capable of performing as a full adder and having the sum output connected back into the input. In any physical embodiment of this expression, if "0" is assigned to '$p$' and "1" to '$q$,' the feedback arrow A must fluctuate between "1" and "0." Taking a particular physical realization of this expression such as a circuit employing the above-described multiple collector transistor, by simple circuit adjustment, it is possible to set up the timing so that a properly shaped input signal could turn on the device, activate the line A and terminate before oscillation begins. The circuit then would contain a perpetuating ON signal, which signal combined with later signals at the '$p$' and '$q$' inputs, would generate positive signals at the → output. This then, is an example of logical bistability and from this it may be seen that the use of greater number of variable inputs would permit higher degrees of logical multi-stability. Consider, for example, the expression in FIGURE 32 wherein two commutators with feedback as in FIGURE 31, are arranged so that the first achieves ∀ and ● simultaneously, with ● output serving as one input for the second and which functions as a full adder. The unlabelled terminal, not shown, is set at "0." A timing chart is shown in FIGURE 33 wherein, in a first time step $T_1$, '$p$', '$q$' receive a "1." In the upper device, the feedback connection A turns on and perpetuates a "1." Similarly, in the lower device, the feedback connection B comes on and perpetuates a "1." The duration of '$p$' and '$q$,' however, are sufficiently, short that they go off before the perpetuated signals in the feedback connections are set up. At a second time step, $T_2$, '$p$' and '$q$' again receive "1." This time, in the upper device, the presence of a "1" plus the second "1," turns off A and delivers "1" at signal C. In the lower device, the presence of "1" plus "1" at '$q$' and "1" from C produces a "1" at the output and continues the perpetuation of the "1" in the feedback B. At $T_3$, '$p$' and '$q$' again receive "1's." In the upper device A turns on to perpetuate "1" and in the lower device the "1" in addition to the perpetuated "1," shuts off the feedback and "1" appears at the output. At $T_4$, in the upper device, the presence of "1" at '$p$' shuts off A and delivers a signal at C. In the lower device, a "1" at '$q$' turns on B and the second "1" from C shuts B off and delivers a "1" at the output. At this point there are no ones perpetuated in the expression so that at $T_5$ as in $T_1$, no output will be received. In $T_6$, $T_7$ and $T_8$, a repeat of the conditions at $T_2$, $T_3$ and $T_4$ respectively will obtain. Thus, it can be seen that the expression in FIGURE 32 will perform according to the timing chart of FIGURE 33, and serves as an illustration of a device involving logical memory wherein outputs are received three out of every four time steps.

A logical phenomenon exhibited by amplitude sensitive commutators such as the above-described multiple collector transistor is known as analog to digital conversion. In three input, two output full adder type amplitude sensitive devices if all three inputs are connected to a single source, the first four binary numbers are achieved. This is illustrated in the following table:

|  'p' 'q' 'r'  | BINARY ||
|---|---|---|
|  | CARRY | SUM |
|  | 2 | 1 |
| None On | 0 | 0 |
| One On | 0 | 1 |
| Two On | 1 | 0 |
| Three On | 1 | 1 |

In view of this the expression of FIGURE 34, illustrates a higher order binary counter involving four full adders. In this expression, there are seven inputs labelled $a, b, c, d, e, f$, and $g$ and three outputs labelled X, Y and Z. The output X will be ON if and only if exactly one, three, five or seven of the external inputs labelled $a, b, c, d, e, f$ and $g$, are on. The output denoted by Y will be ON if and only if exactly two, three, six or seven of the inputs are ON, and the output Z will be ON only if four or more inputs are ON. If a numerical designation of "1" is assigned to X, "2" to Y, and "4" to Z, any physical embodiment of the expression in FIGURE 34 would convert decimal information to binary and if the particular embodiment were made up of amplitude sensitive commutators having all inputs "a" through "g" derived from one source, analog to digital conversion could be accomplished. In the particular illustration shown in FIGURE 34, the first eight binary numbers are obtained. This information is recorded in the table below.

| Inputs On— | BINARY |||
|---|---|---|---|
|  | 4 | 2 | 1 |
|  | Z | Y | X |
| None | 0 | 0 | 0 |
| One | 0 | 0 | 1 |
| Two | 0 | 1 | 0 |
| Three | 0 | 1 | 1 |
| Four | 1 | 0 | 0 |
| Five | 1 | 0 | 1 |
| Six | 1 | 1 | 0 |
| Seven | 1 | 1 | 1 |

In the design of a device having the maximum logical efficiency and versatility for a particular number of input variables, it has been found that the degree of commutativity of the device becomes of greater importance as the number of variables increases.

As previously discussed, in connection with FIGURE 1, there are sixteen possible binary operators, only four of which are noncommutative. As also previously mentioned, a noncommutative operator depends not only on the quantity of variables, but also on the order of the variables. These four operators are listed below.

| 'p' | 'q' | 1 | 2 | 3 | 4 |
|---|---|---|---|---|---|
| 1 | 1 | 1 | 1 | 0 | 0 |
| 0 | 1 | 1 | 0 | 0 | 1 |
| 1 | 0 | 0 | 1 | 1 | 0 |
| 0 | 0 | 1 | 1 | 0 | 0 |

Given the assignments to 'p' and 'q,' the column under (1) exhibits the operator IF THEN symbolized $\supset$ shown in FIGURE 1. The formula $p \supset q$ is assigned "0" if and only if "1" is assigned to 'p' and "0" to 'q.' Similarly, column (2) also describes the operator $\supset$ and in this case the variables are reversed; in other words $q \supset p$. The variable 'q' in this case is known as the antecedent and the variable 'p' in this case is known as the consequent. Columns (3) and (4) describe the negatives of (2) and (1) respectively and are $q \bar{\supset} p$ and $p \bar{\supset} q$. These four are the noncommutative full binary operators.

The addition of $\supset$ or $\bar{\supset}$ to $-$, $\cdot$ and $V$ will permit no reduction in the number of full binary connectives required for an already simplified expression, however, in many cases denial signs can be removed. An example of an elementary noncommutative logical element is shown in the electromechanical device of FIGURE 35. This device will achieve the noncommutative full binary operator $p \supset q$ at output A and $p \bar{\supset} q$ at output B. The use of a device realizing the noncommutative full binary operators is illustrated by a study of FIGURES 13 to 16 and 19 and 20. If one device is assumed for each occurrence of $\supset$ or $\bar{\supset}$ it can be seen that in six of the twenty-six cases which, in FIGURES 13–16, required three logical devices, demand only two. In two other cases, a reduction from two devices to one may be made. In each of the following eight cases an instance of $-$ has been eliminated.

| Guide Basic Group | Simplification $\supset, \bar{\supset}$ |
|---|---|
| BD | $r \bar{\supset} p$ |
| BCE | ⌐⎯$\bar{\supset}$↓ |
| BDH | $p ↓ (q \bar{\supset} r)$ |
| CFG | ⌐⎯$\bar{\supset}$↑ |
| ABCEH | ⌐⎯$\supset$↑ |
| ADFGH | ⌐⎯$\supset$↓ |
| BCDFH | $p | (V \supset q)$ |
| ABCDFH | $p \supset r$ |

The notations

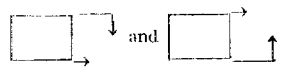 and have → as the antecedent and

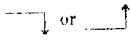

as the consequence of the noncommutative operator involved.

Sixty-eight of the interchange operators in FIGURES 13 to 16 are representative of full ternary connectives and as such they cannot be reduced to functions of two schematic letters. Of these sixty-eight, fourteen are commutative and fifty-four noncommutative. The former can be correlated with the following interchange operators: A, H, AH, BCE, DFG, ABCE, ADFG, BCEH, DFGH, ABCEH, ADFGH, BCDEFG, ABCDEFG and BCDEFGH. It has been determined that $2^{\mu+1}-2$ equals the number of commutative operators of a particular system where $\mu > 1$ and represents the number of variables. There are thirty commutative full quaternary operators. The noncommutative full quaternary operators number in the thousands. This information is summarized in the following table:

| System | Number of variables | Operators ||
|---|---|---|---|
|  |  | Commutative | Noncommutative |
| Binary | 2 | 6 | 2 |
| Ternary | 3 | 14 | 54 |
| Quaternary | 4 | 30 | Thousands |

From the above information, it is evident that in the binary system, three-fourths of the operators are commutative; there is a much smaller percentage of ternary operators that are commutative and that as the number of variables in the system increases the number of operators that are commutative becomes extremely small with relation to the number of operators in the system. In view of the fact that commutative devices of however many inputs will achieve only commutative operators, it has therefore been discovered that the element of non-commutativity must be introduced into logical devices in order to gain logical efficiency. The importance of noncommutativity as previously mentioned is of increasing importance as the number of variables increase. The binary commutator, for example, as a three input multi-purpose device that can achieve all the commutative binary operators, is very flexible, since the operators achieved represent a strong majority of the operators in the system. A similar four input device, on the other hand, which realized only commutative ternary operators would not be correspondingly efficient since the operators would be a smaller percentage of the operators in the system.

It may be seen from truth table considerations that no commutative bias device having three inputs and two outputs will accomplish more than four full binary operators and where all singularly operators are available there is no more effective selection of four full binary operators than ·, V, ∀ and ≡

Since these connectives are obtained from

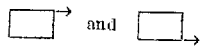 and 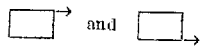

by simple biasing, a full adder is evidently as powerful a *commutative* bias device as possible with three inputs and two outputs.

A bias device having more scope than a full adder is one having three inputs which is capable of realizing the ternary operators BCH at

and ABCF at

The full binary operators

·, V, ∀, ≡, ↓, ⊃ and ⊅ can be obtained by appropriate ON and OFF biasing of inputs and appropriate selection of input for biasing.

Insofar as the appropriate selection of inputs for noncommutative devices and circuits will be one of the chief methods of causing a multipurpose device or circuit to achieve directly the different logical functions desired, we may now consider how it is that the combined principles of biasing and input selection are used theoretically in the above device to achieve the seven full binary functions indicated. It may be remarked parenthetically that no more powerful three input two output noncommutative bias selection device is possible. A noncommutative multi-input bias selection device may be defined as one involving more than two inputs in which at least one of the output functions obtained is noncommutative and in which a statement of the procedure for achieving the different logical functions possible must refer not merely to the number of inputs biased and the way in which they are biased but also to which particular inputs are biased and how in each case they are biased. The latter requirement was not necessary in describing how a *commutative* multi-input multipurpose bias device achieved its different functions directly. These principles will be amply illustrated in the discussion of devices and of circuits which follows. Consider then the three input, two output noncommutative device mentioned above. The table below indicates its overall operation.

| Variable | | | First output | Second output |
|---|---|---|---|---|
| First input | Second input | Third input | | |
| 1 | 1 | 1 | 0 | 1 |
| 0 | 1 | 1 | 1 | 1 |
| 1 | 0 | 1 | 1 | 1 |
| 0 | 0 | 1 | 0 | 0 |
| 1 | 1 | 0 | 0 | 0 |
| 0 | 1 | 0 | 0 | 1 |
| 1 | 0 | 0 | 0 | 0 |
| 0 | 0 | 0 | 1 | 0 |

Let us assume the third input is biased with a constant signal of "1." The first and second inputs then function as the variable inputs. ∀ is achieved at the first output and V is achieved at the second. Let us assume that the third input is biased with a constant signal of "0," again the first and second inputs function as the variable inputs. ↓ is achieved at the first output and ⊅ is achieved at the second. Thus far, four of the seven full binary operators have been obtained. Now let us assume that the second input is biased with a constant selection signal of "1." The first and third inputs now function as the variable inputs. ⊅ (already achieved) is obtained at the first output and ⊃ is obtained at the second. Let us next assume that the second input is biased with a constant selection signal of "0." Again, the first and third inputs function as the variable inputs. ≡ is achieved at the first output and · is achieved at the second output.

All seven of the full binary operators indicated above have thus been achieved. Biasing the first input with a constant selection signal of "1" or "0" will not enable the achievement of any new full binary operator not in the seven already obtained.

In order to illustrate in a comparative way the strength of devices employing this principle of bias and selection let us consider a three input two output electromechanical device very similar to the full adder earlier discussed in detail. The device under discussion is illustrated in FIGURE 36. The device in question is noncommutative but is similar to the three input two output illustrated in FIGURE 2 in that it has three inputs—two outputs and an identical number of point contacts.

Referring now to FIGURE 36 the electromechanical embodiment of the noncommutative logical device in question is shown. In this device three relays 1, 2 and 3 respectively are connected so that each is energized by a separate variable, '*p*,' '*q*' or '*r*.' Power from an appropriate source indicated for illustration as + is routed through relay points to either or both output terminals labelled sum and carry. This device in subsequent discussion will be given the notation

where the upper output is the sum and the lower output is the carry. The following truth table represents the operation of the device.

| Variable | | | Output A | Output B | |
|---|---|---|---|---|---|
| '*p*' | '*q*' | '*r*' | | | |
| 1 | 1 | 1 | 0 | 1 | A |
| 0 | 1 | 1 | 1 | 1 | B |
| 1 | 0 | 1 | 1 | 0 | C |
| 0 | 0 | 1 | 0 | 1 | D |
| 1 | 1 | 0 | 1 | 0 | E |
| 0 | 1 | 0 | 0 | 1 | F |
| 1 | 0 | 0 | 0 | 0 | G |
| 0 | 0 | 0 | 1 | 0 | H |
| | | | BCEH | ABDF | |

This embodiment by function selection assignment to one variable terminal can accomplish six full binary operators. An extensive table, FIGURES 42–45 will be shown later in this discussion to illustrate the greater logical efficiency of this device over a full adder in achieving different functions of three variables.

If the fifty-four noncommutative full ternary interchange operators are examined, it will be evident that in ten cases, a physical embodiment of a device, for example patterned along the lines of the device of FIGURE 36, capable of generating a particular interchange operator, is capable upon biasing to achieve four full binary operators at least one of which is noncommutative. The ten cases are tabulated below:

| Guide basic group | Binary connectives |
|---|---|
| ADF | · ∀ ≡ ⊃ |
| BCH | ∀ ≡ ↓ ⊃ |
| ABCF | · ∨ ⊃ ⊃ |
| ABDF | · ∀ ⊃ ⊃ |
| ABDG | ∀ ≡ ⊃ ⊃ |
| BCDH | ↓ \| ⊃ ⊃ |
| BCFH | ∀ ≡ ⊃ ⊃ |
| BDGH | ↓ \| ⊃ ⊃ |
| ABDFG | ∨ ∀ ≡ ⊃ |
| BCDEH | ∀ ≡ \| ⊃ |

From the above discoveries, it will be apparent that bias devices involving more inputs than the number of variables in the system being handled, and possessing a desired degree of noncommutativity, will provide versatility in a multipurpose logical element.

A multipurpose logical element for ternary logic having more than three inputs and possessing the desired degree of noncommutativity may be fabricated by proper interconnection of a plurality of purely commutative devices. Some evidence of this has been previously presented in connection with feedback arrangements such as those presented in FIGURES 29 and 30. As an illustration of this, consider for example, three multiple collector transistors interconnected as shown in FIGURE 37. The three interconnected commutative devices serve as a single logical element and may be placed in a black box type container shown as a dotted line, with the inputs labelled (1) through (6) and the outputs labelled X, Y and Z brought out. This element, through correct selection of input wires to carry biases and variables will enable the box to accomplish numerous logical operations of the ternary system.

Referring now to FIGURE 38, a table is presented wherein the logical significance of the example shown in FIGURE 37 is illustrated. The left column of the table in FIGURE 38 lists the label and serial number of each of the eighty interchange operators realized with only one signal load per variable input. There are forty-five of these. The center column tabulates a code designation for each interchange operator realized; the code instructs as to the proper terminals for variables and biases, and the location of the output terminal realizing the interchange operator. In this column, the six input wires are symbolized and ordered by the circled numerals, 'p,' 'q' and 'r' represent the variables "1" represents a positive bias or fixed signal of "1," "0" represents no bias or a fixed signal of "0" and X, Y or Z represents the output terminal. In the right column of FIGURE 38, the ternary operators appearing at the other two output terminals are tabulated. It should be noted at this point that the full logical significance of this device is not fully tabulated here. However, in view of the above-detailed discussion, it will be immediately apparent to one skilled in the art that the element of noncommutativity has been provided in this logical device made up of purely interconnected commutative units. Since the concurrent outputs realized from the device are themselves members of other Guide Basic Groups than the tabulated member, it will be apparent that this device is from a logical standpoint, a very efficient and versatile instrument. In this particular illustration, thirty-three full ternary operators are achieved as a result of the noncommutativity introduced. If the arrangement had been purely commutative, no more than fourteen full ternary operators could have been generated.

Another even more versatile illustration of a multipurpose logical element is illustrated in FIGURE 39. In this illustration, four interconnected three input, two output logical devices functioning as full adders, are employed to provide an eight input, four output multipurpose logical element. In each of these elements the use of bias devices was selected because the adjustments to achieve the various logical functions are external, easily controlled and therefore the attention when studying the illustration, could be focused on the logical potentialities rather than on the particular structure involved. It will therefore be apparent to one skilled in the art than similar illustrations, wherein the function selection is accomplished by adjustment other than biasing, may readily be devised.

Referring now to FIGURE 39, an expression is shown that is capable of achieving all eighty interchange operators and hence is capable of performing directly every logical operator in the ternary system. In addition, since a physical counterpatr of this illustration would have eight inputs and four outputs, it will be apparent from the above discussion, that a number of operators from systems having four, five, six, seven and eight variables, will also be realized.

An insight into the logical significance of FIGURE 39, may be acquired through a study of the table provided in FIGURE 40. Each of the interchange operators is listed along with an instruction code similar to the one used in connection with FIGURES 37 and 38. In twenty-two cases indicated by a star, more than one signal load is required. The operators realized at the remaining three output terminals are not listed, but these can easily be determined in view of the above discussion.

It should be noted at this point in the discussion that such a configuration as that portrayed in FIGURE 39 whose logical potentialities have been elaborated in FIGURE 40 can be viewed as the essential element of a miniature computing machine or universal information processing device which differs in some details from some machines of the stored program variety. The art pertaining to the latter is too well known to be recited here in full detail but the following remarks may be made. The essence of the typical stored program type machine is that the program may contain certain instructions which are essentially multipurpose in their function. A conditional transfer instruction for example will cause the machine to execute the instruction contained in one of two alternative locations in the machine depending upon the state of the problem. Such an instruction, a conditional transfer, is thus multipurpose in that the machine is eventually caused to take one of two alternative actions. However, it must be noted that the action of the machine in executing the ultimate command at one location or at another involves an intervening step, that is the transfer itself to the appropriate location, so that a conditional transfer is an *indirect* way of providing for the appropriate logical setup of the machine. It is possible that a computing machine may not only employ indirect logical setup such as the above-outlined and which is well known in the art but also a direct logical setup in which the insertion of an appropriate number into the program will cause the machine not to go to one of two alternative locations for new instructions but rather to set up directly a given local configuration to act one of a variety of ways depending upon the state of the problem. Such a machine would, as mentioned above, require a multipurpose logical element of essentially the same nature theoretically as that indicated in the configuration illustrated in FIGURE 39 which as FIGURE 40 describes, can be adjusted to perform a great variety of different logical functions dependent upon appropriate instruction, shown in FIGURE 40 as code equivalent.

A practical physical embodiment of the expression of FIGURE 39, may be made up using four multiple collector transistors. A wiring diagram of such a device is presented in FIGURE 41, wherein input and output terminals have the same designation as in FIGURE 39.

Referring now to FIGURE 41, a circuit is shown comprising as active elements, four multiple collector transistors of the type described in the above-mentioned copending application Serial No. 645,627. These transistors are shown as elements 10, 20, 30 and 40. Transistor 10 is equipped with a junction emitter 11, an ohmic base connection 12, and two high alpha collectors 13 and 14, respectively. The base 12 is connected to ground. The collectors 13 and 14 are connected through load impedances 15 and 16 to a power and bias source 17, connected in proper polarity for the conductivity type of the transistor and having one terminal connected to ground. Similarly, transistor 20 is provided with emitter 21, base 22, collectors 23 and 24, load impedances 25 and 26 and power and bias source 27 connected in the same manner as the corresponding elements associated with transistor 10. Transistors 30 and 40 are also connected the same as transistors 10 and 20, being provided with emitters 31 and 41, base connections 32 and 42, collectors 33 and 34 and 43 and 44, load impedances 35 and 36 and 45 and 46, and power and bias sources 37 and 47 respectively. Three external input terminals labelled (1), (2) and (3), are connected to the emitter 11 through impedances 50, 51 and 52, respectively. External input terminals (4) and (5) through impedances 53 and 54, are connected to the emitter 21 of transistor 20. Collector 13 is connected through capacitor 62 and impedance 55 to emitter 21. External terminals (6) and (7) are connected to emitter 31 through impedances 56 and 57. Collector 24 is connected through capacitor 63 and impedance 58 to emitter 31. External input terminal (8) is connected to emitter 41 through impedance 59. Collector 23 is connected to emitter 41 through capacitor 64 and impedance 60 and collector 34 is also connected to emitter 41 through capacitor 65 and impedance 61. Collectors 43, 44, 33 and 14 are connected to external output terminals W, X, Y and Z respectively.

The input terminals (1) through (8) receive signals of a given polarity and magnitude with respect to the base potential for each transistor according to the conductivity type selected. The multiple collector transistors are current amplitude sensitive so that a signal or bias at one input line to the emitter produces one increment of current, a second signal on a second line produces a second increment of current at the emitter, and a third signal on a third line, produces a third increment of current at the emitter of the particular transistor. The transistors operate in such a manner that a first collector is conducting for one and three increments of emitter current and is otherwise off, and the second collector is conducting for two and three increments of emitter current and is otherwise off.

The truth table representation of this operation is described in connection with a description of binary full added type logical devices. In this illustration, the multiple collector transistors serve as full adders which performance is described as Mode 1, of operation of this device with collectors 13, 23, 33 and 43 serving as the sum outputs and collectors 14, 24, 34 and 44 serving as carry outputs.

In operation, taking as a specific illustration interchange operator No. 50, having Guide Basic Group label DFGH, from FIGURE 40, it is determined that the input terminals receive the following designation. Terminal (1) receives the variable 'p'; terminal (2) receives a steady function selection signal of "0"; terminal (3) receives a steady function selection signal of "0"; terminal (4) receives the variable 'q'; terminal (5) receives the variable 'r'; terminal (6) receives a steady function selection signal of "1"; terminal (7) receives a steady function selection signal of "0"; and terminal (8) receives a steady function selection signal of "1." Under these conditions of biasing the following truth table describes the logical behavior of the circuit.

|   | 'p' | 'q' | 'r' | W | X | Y | Z |
|---|-----|-----|-----|---|---|---|---|
| A | 1 | 1 | 1 | 1 | 1 | 0 | 0 |
| B | 0 | 1 | 1 | 0 | 1 | 0 | 0 |
| C | 1 | 0 | 1 | 0 | 1 | 0 | 0 |
| D | 0 | 0 | 1 | 0 | 1 | 1 | 0 |
| E | 1 | 1 | 0 | 0 | 1 | 0 | 0 |
| F | 0 | 1 | 0 | 0 | 1 | 1 | 0 |
| G | 1 | 0 | 0 | 0 | 1 | 1 | 0 |
| H | 0 | 0 | 0 | 1 | 0 | 1 | 0 |

Referring now to the truth table and FIGURE 41, in condition A of the truth table 'p' at terminal (1) introduces one increment of current and since terminals (2) and (3) each receive "0," the one increment turns ON collector 13 of transistor 10 which, along with the presence of 'q' and 'r' at terminals (4) and (5) provide three increments of current and turn ON both collectors 23 and 24 of transistor 20. Transistor 30 has one increment of current present due to the bias at terminal (6) and another increment of current due to the collector 24 of transistor 20 being ON, since terminal (7) is biased at "0," there are two increments of current so that only collector 34 is turned ON. In transistor 40, one increment of current is received through the steady signal at terminal (8), a second increment is received through collector 34 and a third increment is received through collector 23. These conditions turn ON both collectors 43 and 44, delivering signals to output terminals W and X respectively. Since collectors 33 and 14 are not ON no signal appears at output terminals Y and Z respectively.

In condition B of the truth table, a "0" at terminal (1) along with a "0" at terminal (2), provides no signal at either collector 13 or 14 and hence, a "0" at terminal Z. The presence of a signal at terminals (4) and (5) along with a "0" from collector 13, turns ON collector 24 only, of transistor 20. In transistor 30, one increment of current is provided by collector 24, a second increment of current is provided by the steady bias on terminal (6) and since terminal (7) is "0," collector 34 only is ON, and since collector 33 is "0," a "0" appears at terminal Y. In transistor 40, two increments of current appear, one from the bias on terminal (8) and one from collector 34; collector 23 is not ON; these conditions turn only collector 44 ON and thereby a "1" appears at terminal X and a "0" at terminal W.

In condition C, 'p' is present, 'r' is present and 'q' is not present, 'p' being present turns ON collector 13 and a "0" appears at terminal Z. The signals from 'r' at terminal (8) and collector 13, turn ON collector 24. The signals from terminal (6) and collector 24 turn ON collector 34, and provide a "0" at terminal Y. The signals at terminal (8) and collector 34, turn ON collector 44, and provide a "1" at terminal X and a "0" at terminal W.

In condition D, since 'p' is absent, transistor 10 does not conduct and a "0" appears at terminal Z. In transistor 20, only 'r' from terminal (5) appears, hence only collector 23 is ON. In transistor 30, only the bias on terminal (6) is present so only collector 33 is ON and a "1" appears at terminal Y. In transistor 40, two increments of current are received, one from the bias on terminal (8), and the other from collector 23. This turns ON collector 44 only, and provides a "1" at terminal X and a "0" at terminal W.

In condition E, the presence of 'p' turns ON collector 13, and provides a "0" at terminal Z. The presence of 'q' and the signal at collector 13, turn ON collector 24. The presence of the signal at collector 24 and the steady bias at (6) turn ON collector 34 and provide a "0" at Y. The presence of a signal at collector 34 and a steady bias at (8) turns ON collector 44, providing thereby a "1" at X and a "0" at W.

In condition F, 'p' being absent, transistor 10 does not conduct and "0" appears at Z. In transistor 20, 'q' turns ON collector 23. In transistor 30, the signal at (6) turns ON collector 33 and provides an output at Y. In transistor 40, the signal at collector 23 and the signal at (8), turn ON collector 44, providing a "1" at X and a "0" at W.

In condition G, only 'p' is present. Hence, in transistor 10, collector 13 is "on," and a ON is present at Z. In transistor 20, collector 23 is ON. In transistor 30, collector 33 is ON providing a "1" at Y. In transistor 40, collector 44 is ON providing a "1" at X and a "0" at W.

Finally, in condition H, since 'p' is not present, neither collector of transistor 10 conducts and a "0" appears at Z. In transistor 20, no input appears and neither collector conducts. In transistor 30, the steady bias at (6) turns ON collector 33, and provides a "1" at Y. In transistor 40, the steady bias at (8) turns ON collector 43, providing a "1" at W and a "0" at Z.

From examination of the truth table, it will be seen that at terminal Y, interchange operator No. 50, having a "1" in conditions DFG and H, is realized. At the same time terminal W realizes interchange operator No. 8, labelled AH, terminal X realizes interchange operator No. 76, labelled ABCDEFG and terminal Z realizes interchange operator No. 1, labeled—ABCDEFGH.

Further, with respect to the binary system, considering for conditions ABC and D that 'r' is a positive bias; ⊕ is realized at W, nullary positive is realized at X, ↓ is realized at Y and nullary negative is realized at Z. If 'r' is considered a steady "0" bias in conditions E, F, G and H; ↓ is realized at W, V is realized at X, | is realized at Y, and nullary negative is realized at Z.

With respect to the quaternary system, this illustration will not achieve all of the sixty-five thousand five hundred thirty-six basic operators in the system, however it will be apparent to one skilled in the art that with four terminals for variables, four terminals for bias signals and four output terminals each achieving a quaternary operator and each quaternary operator achieved being a member of an interchange group of quaternary operators, a substantial percentage of the system can be realized and that by the addition of further active elements connected along the lines demonstrated by this illustration, the entire system can be realized with a maximum of logical efficiency and versatility.

The above comments apply as well to higher order systems.

The following table of specifications is presented for the operation of the illustrative logical multipurpose element shown in FIGURE 41, it being understood that this should not be construed as a limitation in view of the wide variety of specifications possible for operating the active elements in such a device and the large number of types of active elements available in the art.

Transistors 10, 20, 30 and 40:
    Germanium-alloy junction emitter, N
    Conductivity type base, —2 point
    Contact collectors
    Base resistivity, 3 ohm cm.
    Emitter resistivity, .1 ohm cm.
    Base thickness, 0.0009 in.
    Emitter material, indium
    Emitter depth, 0.0001 in.
    Collector material, Phosphor bronze
    Collector treatment, electroformed
    Collector-collector spacing, .002 in.
    Collector-base contact spacing, 0.003 in.

Resistors 15, 25, 35, 45, approx. 2000 ohms.
Resistors 16, 26, 36, 46, approx. 4000 ohms.
Resistors 50, 51, 52, 53, 54, 56, 57, 59, approx. 10,000 ohms.
Resistors 55 and 60, approx. 8000 ohms.
Resistors 58 and 61, approx. 9000 ohms.
Batteries 17, 27, 37 and 47, 25 volts.
Capacitors 62, 63, 64, and 65, approx. 0.1 microfarad.
Input signal level shift, approx. —0 to +20 volts. Duration, 1000 micro. sec.
Output signal level shift, approx. —10 to 0 volt.

Approximate values are recited in certain cases due to the variation in characteristics of transistors.

A further illustration of the increase in logical efficiency and versatility achieved through noncommutativity may be seen by referring to FIGURES 42, 43, 44 and 45. In these figures a table is presented wherein all eighty interchange groups of the ternary system are realized using as a basic logical element, the noncommutative bias device described above having the symbol

An embodiment of this device has already been shown in FIGURE 36, and a discussion of its overall logical operation is presented. It should be noted that in each of the eighty cases no more than three devices are employed for any case and in several cases a reduction to only one device is realized. The relative efficiency of this device, which uses the principle of selection of inputs (in a multi-input noncommutative device) for appropriate biasing or variable input, to the earlier commutative full adder cited (also having three inputs and two outputs) may be seen by comparing the table contained in FIGURES 42, 43, 44 and 45 with the tables contained in FIGURES 13, 14, 15, 16, 19 and 20, since the same class of eighty ternary functions are achieved in each case. If the functions ↓ and | are not available (as they would not be in the biasing of a normal full adder) two of the eighty cases require four devices, forty-one of the eighty cases require three devices, and the remainder of the eighty cases require two, one, or none devices. Using noncommutative device of FIGURE 36, however, from the table described in FIGURES 42, 43, 44, and 45, it can be seen that none of the eighty cases require four devices, only fifteen of the eighty cases require three devices, and the remainder of the eighty cases two, one, or none. The total results of the comparison may be summarized in the table below:

| 80 guide basic group devices required | Noncommutative device (FIGURES 42–45) | Commutative device (full adder FIGS. 13–16, 19, 20) |
| --- | --- | --- |
| 4 | 0 | 2 |
| 3 | 15 | 41 |
| 2 | 53 | 27 |
| 1 | 9 | 7 |
| 0 | 3 | 3 |

It is readily seen from the table above that in general fewer of the noncommutative devices (selected and biased in the appropriate manner) are required than the commutative device to achieve the illustrative eighty functions of the ternary system. The same principle will apply to systems of a higher order of variables, as one skilled in the art will recognize.

It may then be seen, therefore, that multipurpose bias selection logical elements made up of noncommutative devices and assembled along the logical lines indicated by elements illustrated in FIGURES 37 and 39 will provide the maximum in logical versatility and efficiency for any number of input variables comprising the data to be handled.

What has been described is a logical phenomenon whereby functions of higher orders of variables include lesser ones. This phenomenon, together with the fact that a possibility of direct realization of many logical operators, will make possible the design of multipurpose logical elements having great logical efficiency and versatility. A method for the design of multipurpose devices has been advanced whereby the use of both commutative and noncommutative logical elements is described in the fabrication of logical multipurpose devices capable of handling any number of variables. The binary and ternary orders of variables have been used for convenience to illustrate the logical principles involved in this invention, and though the material to be handled will be voluminous, the principles here advanced will be readily applicable by one skilled in the art, to higher order systems of variables. Many unique expressions of logical arrangements such as feedback device involving oscillation and memory, and analog to digital conversion have been illustrated, so that their manifestation in a physical embodiment may be readily accomplished. Some illustrations of multipurpose bias controlled logical devices, have been shown wherein the active elements for the devices are capable of realizing directly certain operators of the system being handled so that through judicious interconnection of the elements, the overall device is capable of realizing all of the operators of the system.

Although the discussion thus far has been couched primarily in logical language for reasons primarily of rigor, clarity and generality, it is fully applicable to machine configurations of a purely arithmetic nature insofar as arithmetic operations are merely special cases of logical ones as one skilled in the art will recognize. Binary multiplication and addition for example, can be represented in logical terms alone. A binary multiplication device can be represented by a series of embodiments which can be correlated with purely logical expressions. For purposes of illustration let us consider a very elementary multiplication device which provides the arithmetic product of two two-bit numbers. Referring to the illustration in FIGURE 46, we may assume that one of these numbers, the multiplicand, is introduced at the inputs '$r$' and '$s$,' '$r$' being the more significant bit and '$s$' being the less significant bit. In other words, '$s$' carries the first or smaller digit and '$r$' carries the other. The other two-bit number, the multiplier, is introduced at inputs '$p$' and '$q$,' '$p$' carrying the more significant bit and '$q$' the less significant bit. The outputs W, X, Y and Z carry the four bits in order of significance, starting with W as most significant and Z as less significant, necessary to represent fully the unrounded product of two two-bit numbers; where Z is an output from an embodiment which may be correlated with the logical expression $q \cdot s$ (in the manner amply illustrated in the foregoing material) and where Y is an output from an embodiment which may be correlated with the logical expression $$(p \cdot s) \forall (r \cdot q)$$

and where X is an output from an embodiment which may be correlated with the logical expression $p \cdot r \cdot (q|s)$; and where W is an output from an embodiment which can be correlated with the logical expression $p \cdot q \cdot r \cdot s$. Where all these conditions are satisfied for inputs and outputs a binary multiplication device for two two-bit numbers is achieved.

This may be seen from the following table.

| Multiplier | | Multiplicand | | Product | | | |
|---|---|---|---|---|---|---|---|
| 2 '$p$' | 1 '$q$' | 2 '$r$' | 1 '$s$' | 8 W | 4 X | 2 Y | 1 Z |
| 1 | 1 | 1 | 1 | 1 | 0 | 0 | 1 |
| 0 | 1 | 1 | 1 | 0 | 0 | 1 | 1 |
| 1 | 0 | 1 | 1 | 0 | 1 | 1 | 0 |
| 0 | 0 | 1 | 1 | 0 | 0 | 0 | 0 |
| 1 | 1 | 0 | 1 | 0 | 0 | 1 | 1 |
| 0 | 1 | 0 | 1 | 0 | 0 | 0 | 1 |
| 1 | 0 | 0 | 1 | 0 | 0 | 1 | 0 |
| 0 | 0 | 0 | 1 | 0 | 0 | 0 | 0 |
| 1 | 1 | 1 | 0 | 0 | 1 | 1 | 0 |
| 0 | 1 | 1 | 0 | 0 | 0 | 1 | 0 |
| 1 | 0 | 1 | 0 | 0 | 1 | 0 | 0 |
| 0 | 0 | 1 | 0 | 0 | 0 | 0 | 0 |
| 1 | 1 | 0 | 0 | 0 | 0 | 0 | 0 |
| 0 | 1 | 0 | 0 | 0 | 0 | 0 | 0 |
| 1 | 0 | 0 | 0 | 0 | 0 | 0 | 0 |

The columns of "1" and "0" under '$p$,' '$q$,' '$r$' and '$s$' represent all possible input states. The rows of "1's" and "0's" under W, X, Y and Z indicate the binary numbers obtained when the binary numbers under the multiplier and multiplicand are multiplied together. For example, in the first row down the binary number three (represented in binary notation by 1 1) is multiplied by the binary number three (1 1). The binary number nine (1001) is indicated as their product. It can be seen that a "1" is obtained in the column under W just in that one case where a "1" is obtained under all four variables '$p$,' '$q$,' '$r$' and '$s$'. Logically, this means that W can be achieved by an embodiment correlated with the local expression $p \cdot q \cdot r \cdot s$, as already stated. Z, on the other hand, has "1's" in its column just in those cases where a "1" appears both in the column under '$q$' and under '$s$.' Logically, this means that Z can be achieved by any embodiment which can be correlated with the logical expression $q \cdot s$. Similar logical analysis will reveal X and Y to be equivalent to the expressions recited.

A reduction of a logical multiplication device to embodiments which can be represented by logical expressions can be made in a similar though more complicated way by one skilled in the art for multipliers and multiplicands of any numbers of bits.

It can be seen therefore that as already remarked arithmetic operations can be reduced to logical ones and and that the discussion is, in general, applicable to the former as well as to the latter.

These principles and illustrations, in accordance with this invention, make possible a complete philosophy of devices. Each device may now be considered to be a miniature machine for information processing itself, since each is capable of realizing directly all of the possible logical operations involving the information presented to it. Combinations of these miniature machines may now be assembled into arrangements having a local scope approaching infinity. In such combinations, logic is handled merely by where information is put in and biasing or other adjustment, there being no dynamic interconnection of logical elements such as circuitry or mechanical linkages and, under the influence of a program, each logical device may accomplish directly, a desired logical function at one time and a different function at another.

The various advantages of the logical approach to machine design herein described have been amply illustrated throughout the discussion in terms of economy, efficiency and versatility. The obvious fact should also be emphasized, however, at least, that building a machine out of blocks which are essentially similar to one another although differently orientated in the machine will enable easier checking and servicing of the machine and in general will provide new ways in which machines may be rendered more reliable. To one skilled in the art the full extent of the latter possibility is at present conjectural, but there is no question that there is ample opportunity for innovation and improvement in machines constructed along the lines proposed.

For example, consider the multipurpose circuit illustrated in FIGURE 37. If FIGURE 38 is examined it can be seen that Guide Basic Group No. 17, that is ABG, is achieved at output X when the code equivalent set up is $q\ r\ 1\ p\ 1\ 1 - X$. Let us suppose however that the code equivalent set up is modified to $q\ r\ 1\ p\ 1\ 0 - Y$. The same function ABG is achieved but at the output Y instead of X as above indicated. The only difference between the two setups in so far as input conditions is concerned is that the final "1" is changed to a "0". We thus have an example of a circuit which because of its character as a multipurpose bias mechanism can be made to achieve the same function in two fundamentally different logical ways but without a corresponding duplication of equipment. Such duplication of logical function and operation without corresponding duplication of parts present many new possibilities for internal checking and the design of related circuitry to make effective use of the redundancy achieved for purpose of reliability.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A variable logical circuit comprising in combination a first, a second, a third and a fourth full adder type transistor, each of said transistors being provided with an emitter connection, a base connection and a first and a second collector connection, power and bias means associated with each said transistor operative to provide current flow through said collector connections in response to current introduced through said emitter connection, a first input terminal, a first input impedance having one terminal connected to said first input terminal and having its other terminal connected to said emitter of said first transistor, a second input terminal, a second input impedance having one terminal connected to said second input terminal and having its other terminal connected to said emitter of said first transistor, a third input terminal, a third input impedance having one terminal connected to said third input terminal and having its remaining terminal connected to said emitter of said first transistor, a fourth input terminal, a fourth input impedance having one terminal connected to said fourth input terminal and having its other terminal connected to said emitter of said second transistor, a fifth input terminal, a fifth input impedance having one terminal connected to said fifth input terminal and having its other terminal connected to said emitter of said second transistor, a sixth input terminal, a sixth input impedance having one terminal connected to said sixth input terminal and having its other terminal connected to said emitter of said third transistor, a seventh input terminal, a seventh input impedance having one terminal connected to said seventh input terminal and having its other terminal connected to said emitter of said third transistor, an eighth input terminal, an eighth input impedance having one terminal connected to said eighth input terminal and having its other terminal connected to said emitter of said fourth transistor, a first coupling capacitor having one terminal connected to said first collector of said first transistor, a ninth input impedance having one terminal connected to the remaining terminal of said first capacitor and having its remaining terminal connected to said emitter of said second transistor, a second coupling capacitor having one terminal connected to said second collector of said second transistor, a tenth input impedance having one terminal connected to the remaining terminal of said second capacitor, and having its remaining terminal connected to said emitter of said third transistor, a third coupling capacitor having one terminal connected to said second collector of said third transistor, an eleventh input impedance having one terminal connected to the remaining terminal of said third capacitor and having its remaining terminal connected to said emitter of said fourth transistor, a fourth coupling capacitor having one terminal connected to said first collector of said second transistor, a twelfth input impedance having one terminal connected to the remaining terminal of said fourth capacitor and having the remaining terminal connected to the emitter of said fourth transistor, a first output terminal connected to said second collector of said first transistor, a second output terminal connected to said first collector of said third transistor, a third output terminal connected to said second collector of said fourth transistor, and a fourth output terminal connected to said first collector of said fourth transistor.

2. A variable logical device comprising in combination a first binary full adder element having each of the three inputs provided as an external input to said device and having the carry output provided as a first output of said device; a second binary full adder element having one of the three inputs assigned to receive the information appearing at the sum output of said first adder, having each of the two remaining inputs serving as an external input to said device; a third binary full adder element having one input assigned to receive information appearing at the carry output of said second adder, having each of the two remaining inputs serving as an external input to said device and having the sum output serving as a second external output for said device; and a fourth binary full adder element having one input assigned to receive information appearing at the sum output of said second adder, having another input assigned to receive information appearing at the carry output of said third adder, having the remaining input terminal serving as an external input to said device, having the carry output serving as a third external output to said device and having the sum output serving as a fourth external output to said device.

3. A variable logical device comprising in combination, a first binary full adder circuit having each of the three inputs provided as an external input to said device and having the carry output provided as a first output of said device; a second binary full adder circuit having one of the three inputs assigned to receive the information signals appearing at the sum output of said first adder, having each of the two remaining inputs serving as an external input to said device; a third binary full adder circuit having one input assigned to receive information signals appearing at the carry output of said second adder, having each of the two remaining inputs serving as an external input to said device and having the sum output serving as a second external output for said device; and a fourth full adder circuit having one input assigned to receive information signals appearing at the sum output of said second adder, having another input assigned to receive information signals appearing at the carry output of said third adder, having the remaining input terminal serving as an external input to said device, having the carry output serving as a third external output to said device and having the sum output serving as a fourth external output to said device.

4. A multipurpose bias logical device comprising: a physical system having a particular number of inputs in excess of the number of variable information signals in a particular mode of logical comparison, at least one output, and which realizes in a single logical comparison at least one logical function relating a number of information signals equal to said particular number of inputs and which in said logical function none of the inputs is irrelevant to the output, and which will on appropriate biasing of inputs operate in various modes in which not all of the input variables participate as variable inputs and in which the given inputs selected for biasing and the particular bias condition for these biased inputs determines in which mode the system operates, biasing means coupled to at least one of said inputs, said biasing means operating continuously for the time that said system is to operate in a particular mode, logical variable information signal introduction means coupled to less than said number of inputs and sensing means for information signals appearing at an appropriate output.

5. A variable logical device capable of a multiplicity of modes of logical operations comprising: a physical logical system having a particular number of inputs in excess of the number of variable information signals in a particular mode of logical comparison, at least one output, and which realizes in a single logical comparison at least one logical function relating a number of information signals equal to said particular number of inputs and in which in said logical function none of the inputs is irrelevant to the output, and which will on appropriate biasing of inputs operate in various modes in which not all of the input variables participate as variable inputs and in which the given inputs selected for biasing and the particular bias condition for those biased inputs determines in which mode the system operates, biasing means coupled to at least one of said inputs, said biasing means operating continuously for the time that said system is to operate in a particular mode, logical variable information signal introduction means coupled to less than said number of inputs, sensing means for information signals appearing at an appropriate output and means for selecting which inputs receive biases, for selecting which inputs receive variable inputs and for selecting which bias conditions are applied to said biased inputs.

6. A multipurpose bias logical device comprising: an array of at least two physical systems each having at least one input and at least one output and at least one physical system of said array being coupled to at least one other physical system of said array whereby at least one output from one said physical system serves as at least one input of another said physical system and at least one physical system of said array having a particular number of inputs in excess of the number of variable information signals in a particular mode of logical comparison at least one output and which realizes in a single logical comparison at least one logical function relating a number of information signals equal to said particular number of inputs and in which said logical function none of the inputs it irrelevant to the output, and which will on appropriate biasing of inputs operate in various modes in which not all of the input variables participate as variable inputs and in which the given inputs selected for biasing and the particular bias condition for these biased inputs determine in which mode the system operates, biasing means coupled to at least one of said inputs, said biasing means operating continuously for the time that said system is to operate in a particular mode, logical variable information signal introduction means coupled to less than said number of inputs and sensing means for information signals appearing at an appropriate output.

7. A multipurpose bias logical device comprising: an array of at least two physical systems each having at least one input and at least one output and at least one physical system of said array being coupled to at least one other physcial system of said array whereby at least one output from one physical system serves as at least one input of another said physical system and at least one physical system of said array having a particular number of inputs in excess of the number of variable information signals in a particular mode of logical comparison at least one output and which realizes in a single logical comparison at least one logical function relating a number of information signals equal to said particular number of inputs and in which said logical function none of the inputs is irrelevant to the output, and which will on appropriate biasing of inputs operate in various modes in which not all of the input variables participate as variable inputs and in which the given inputs selected for biasing and the particular bias condition for these biased inputs determine in which mode the system operates, biasing means coupled to at least one of said inputs, said biasing means operating continuously for the time that said system is to operate in a particular mode, logical variable information signal introduction means coupled to less than said number of inputs, means for selecting which of said physical systems of said array receive biases, means for selecting which inputs receive biases, means for selecting which inputs receive variable inputs and means for selecting which bias conditions are applied to said biased inputs.

References Cited in the file of this patent

UNITED STATES PATENTS

| 2,655,598 | Eckert et al. | Oct. 13, 1953 |
| 2,735,936 | Gridley | Feb. 21, 1956 |
| 2,818,555 | Lo | Dec. 31, 1957 |

OTHER REFERENCES

Goodell: "Decision Elements," Radio-Electronic Engineering, July 1952, pages 3–5; September 1952, pages 14–16, 31; October 1952, pages 10–12.

Sherertz: "Electronic Circuits of the NAREC Computer," Proc. IRE, October 1953, page 1319 relied on.

Goodell: "Decision Elements," Radio-Electronic Engineering, August 1952, pages 14 to 16 relied on.

Brooks: "Symbolic Logic, Binary Calculation, and 3C–PACs," Computer Control Co.

Goodell: "The Foundations of Computing Machinery," The Journal of Computing Systems (J.C.S.), vol. 1, No. 1, June 1952, pages 1–13; vol. 1, No. 2, January 1953, pp. 86–110.

Lode: "The Realization of a Universal Decision Element," J.C.S., vol. 1, No. 1, June 1952, pages 14–22.

Sobocinski: "On a Universal Decision Element," J.C.S., vol. 1, No. 2, January 1953, pages 71–80.

Martin: "On Completeness of Decision Element Sets," J.C.S., vol. 1, No. 3, July 1953, pages 150–154.

UNITED STATES PATENT OFFICE
CERTIFICATE OF CORRECTION

Patent No. 3,028,088                          April 3, 1962

Bradford Dunham

It is hereby certified that error appears in the above numbered patent requiring correction and that the said Letters Patent should read as corrected below.

Column 6, line 17, for the expression "-(p·q)·-($\bar{p}$·q)" read -- -(p·$\bar{q}$)·-($\bar{p}$·q) --; column 11, line 29, for the symbol "↓" read -- | --; column 15, line 26, for the expression "(q·r)∀(p·(x∀r))" read -- (q·r)∀(p·(q∀r)) --; column 20, line 17, for the symbol "|" read -- ↓ --; column 24, line 31, for "CFG" read -- DFG --; column 25, line 26, for "singularly" read -- singulary --; column 29, line 1, for "'on,'" read -- ON --; same line 22, --; column 31, line 22, for "ON" read -- O --; column 34, line 57, for "local" read -- logical --.

Signed and sealed this 17th day of July 1962.

(SEAL)
Attest:
ERNEST W. SWIDER
Attesting Officer

DAVID L. LADD
Commissioner of Patents